(12) United States Patent
Whelan et al.

(10) Patent No.: US 9,465,582 B1
(45) Date of Patent: Oct. 11, 2016

(54) SIGNIFICANT RANDOM NUMBER GENERATOR

(75) Inventors: David A. Whelan, Newport Coast, CA (US); Gregory M. Gutt, Ashburn, VA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 13/229,668

(22) Filed: Sep. 9, 2011

Related U.S. Application Data

(63) Continuation-in-part of application No. 12/949,404, filed on Nov. 18, 2010, now Pat. No. 9,009,796.

(51) Int. Cl.
| | |
|---|---|
| G06F 7/04 | (2006.01) |
| G06F 7/58 | (2006.01) |
| H04L 9/06 | (2006.01) |
| G01S 13/22 | (2006.01) |

(52) U.S. Cl.
CPC .............. *G06F 7/588* (2013.01); *G06F 7/58* (2013.01); *G06F 7/582* (2013.01); *G01S 13/222* (2013.01); *H04L 9/0662* (2013.01)

(58) Field of Classification Search
CPC ....... G06F 7/588; G06F 7/58; H04L 9/0662; G01S 13/222
USPC .......................................................... 726/5
See application file for complete search history.

(56) References Cited

U.S. PATENT DOCUMENTS

| | | | | |
|---|---|---|---|---|
| 4,114,155 A | * | 9/1978 | Raab | G01S 19/30 342/394 |
| 4,389,671 A | * | 6/1983 | Posner et al. | 380/235 |
| 5,007,088 A | * | 4/1991 | Ooi et al. | 380/46 |
| 5,434,847 A | * | 7/1995 | Kou | 370/252 |
| 6,182,011 B1 | * | 1/2001 | Ward | 701/479 |
| 7,042,392 B2 | | 5/2006 | Whelan et al. | |
| 7,372,400 B2 | | 5/2008 | Cohen et al. | |
| 7,468,696 B2 | | 12/2008 | Bornholdt | |
| 7,489,926 B2 | | 2/2009 | Whelan et al. | |
| 7,554,481 B2 | | 6/2009 | Cohen et al. | |
| 7,579,986 B2 | | 8/2009 | DiEsposti et al. | |
| 7,579,987 B2 | * | 8/2009 | Cohen et al. | 342/357.44 |
| 7,583,225 B2 | | 9/2009 | Cohen et al. | |
| 7,619,559 B2 | | 11/2009 | DiEsposti | |
| 7,688,261 B2 | | 3/2010 | DiEsposti | |
| 8,015,224 B1 | * | 9/2011 | Chaichanavong et al. | 708/254 |

(Continued)

*Primary Examiner* — Techane Gergiso
(74) *Attorney, Agent, or Firm* — Vista IP Law Group LLP; Cynthia A. Dixon

(57) ABSTRACT

A system, method, and apparatus for a significant random number generator are disclosed. The method involves sensing, with a sensor on a spacecraft, a physical phenomenon. In one or more embodiments, the system utilizes a Lower Earth Orbiting (LEO) Iridium satellite for the spacecraft. The method further involves outputting, from the sensor, a value for the physical phenomenon. Also, the method involves inputting the value of the physical phenomenon into a pseudo-random number generator (PRNG). In addition, the method involves generating, with the PRNG, a sequence of random numbers using the value of the physical phenomenon as a seed for the PRNG. In some embodiments, the disclosed significant random number generator is employed by a spot beam based authentication system that is used to authenticate a claimant. In other embodiments, the disclosed significant random number generator is used for cryptology, routing network traffic, anti-jamming, certified time stamping, and secure identification applications.

24 Claims, 19 Drawing Sheets

(56) References Cited

U.S. PATENT DOCUMENTS

| | | | |
|---|---|---|---|
| 2004/0252053 A1* | 12/2004 | Harvey | G01S 19/05 342/357.75 |
| 2005/0094464 A1* | 5/2005 | Gammel | 365/222 |
| 2005/0129247 A1* | 6/2005 | Gammel et al. | 380/286 |
| 2005/0159891 A1 | 7/2005 | Cohen et al. | |
| 2006/0235917 A1* | 10/2006 | Manber | 708/250 |
| 2007/0230694 A1* | 10/2007 | Rose et al. | 380/46 |
| 2008/0059059 A1 | 3/2008 | Cohen et al. | |
| 2008/0143605 A1 | 6/2008 | Bornholdt | |
| 2008/0146246 A1 | 6/2008 | Bornholdt | |
| 2009/0174597 A1 | 7/2009 | DiLellio et al. | |
| 2009/0228210 A1 | 9/2009 | Gutt | |
| 2009/0278736 A1* | 11/2009 | Cohen | G01S 13/003 342/357.55 |
| 2009/0300312 A1* | 12/2009 | Handschuh et al. | 711/166 |
| 2009/0303104 A1* | 12/2009 | Shoemaker et al. | 342/120 |
| 2009/0315764 A1 | 12/2009 | Cohen et al. | |
| 2009/0315769 A1 | 12/2009 | Whelan et al. | |
| 2009/0316898 A1* | 12/2009 | Omar et al. | 380/255 |
| 2010/0034078 A1* | 2/2010 | Jia et al. | 370/210 |
| 2010/0054466 A1* | 3/2010 | Kerins et al. | 380/46 |
| 2010/0124331 A1* | 5/2010 | Park et al. | 380/268 |
| 2010/0211787 A1* | 8/2010 | Bukshpun et al. | 713/170 |

* cited by examiner

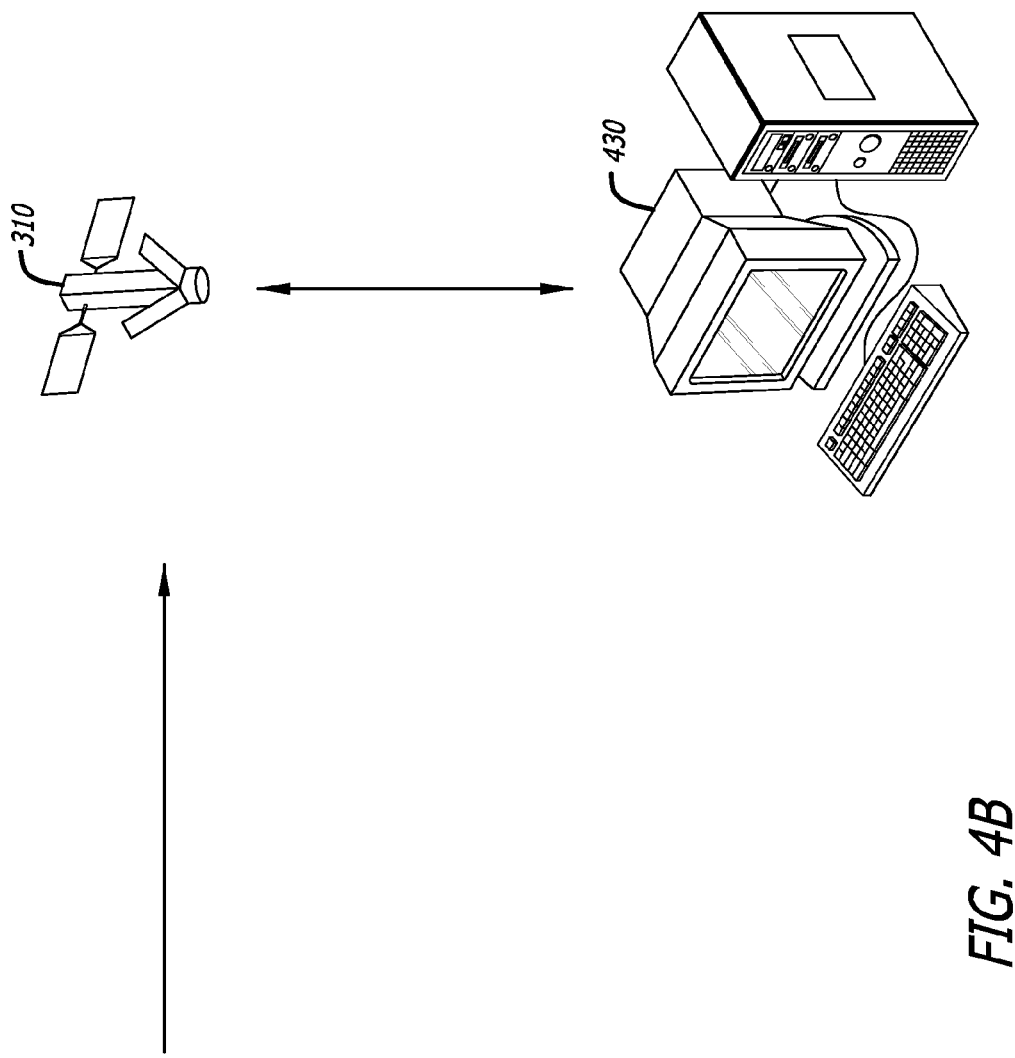
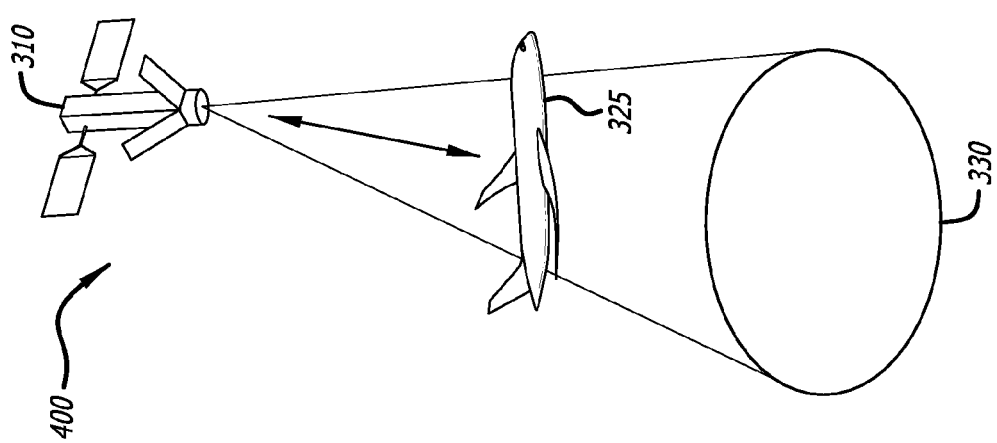
FIG. 4B

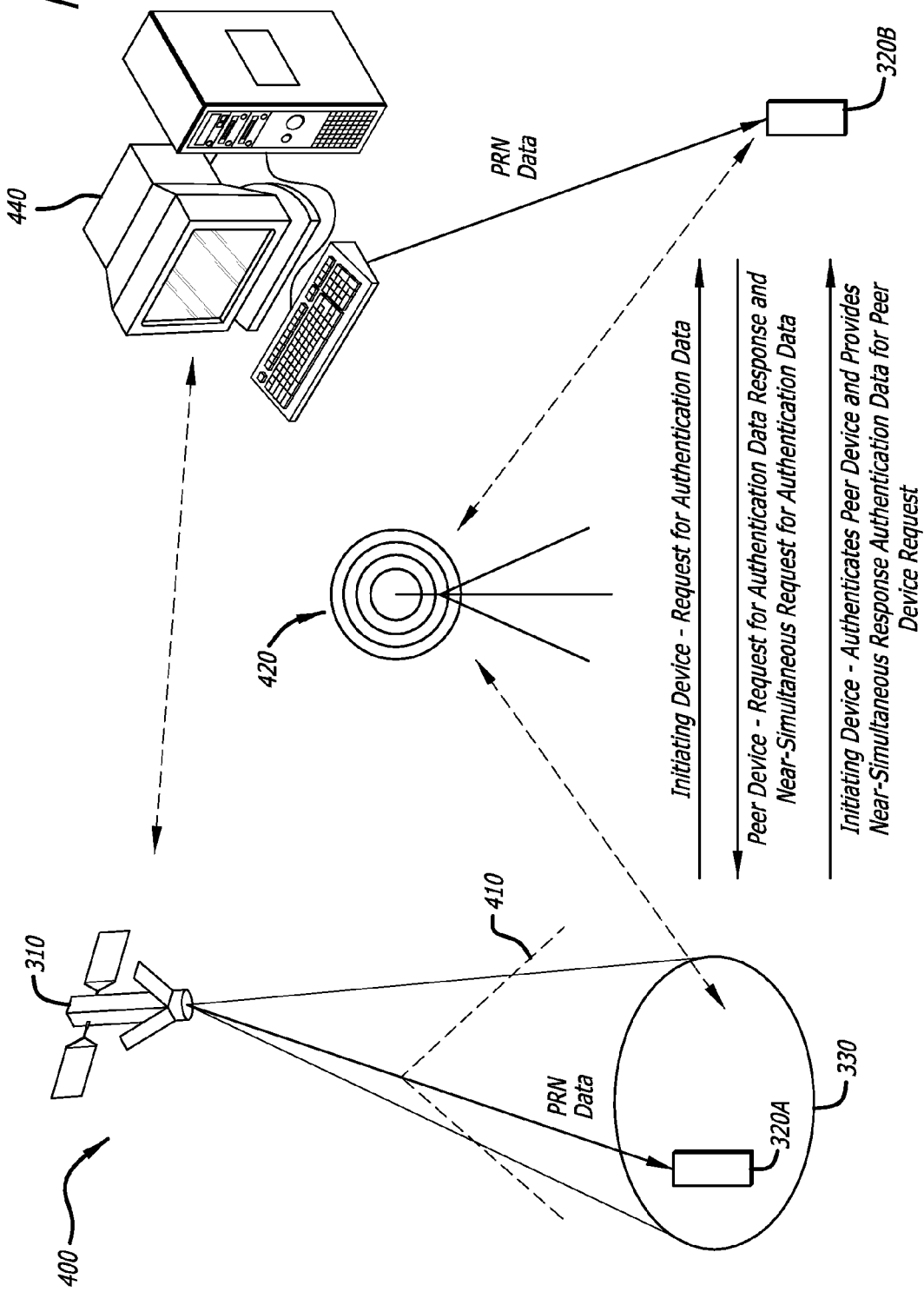

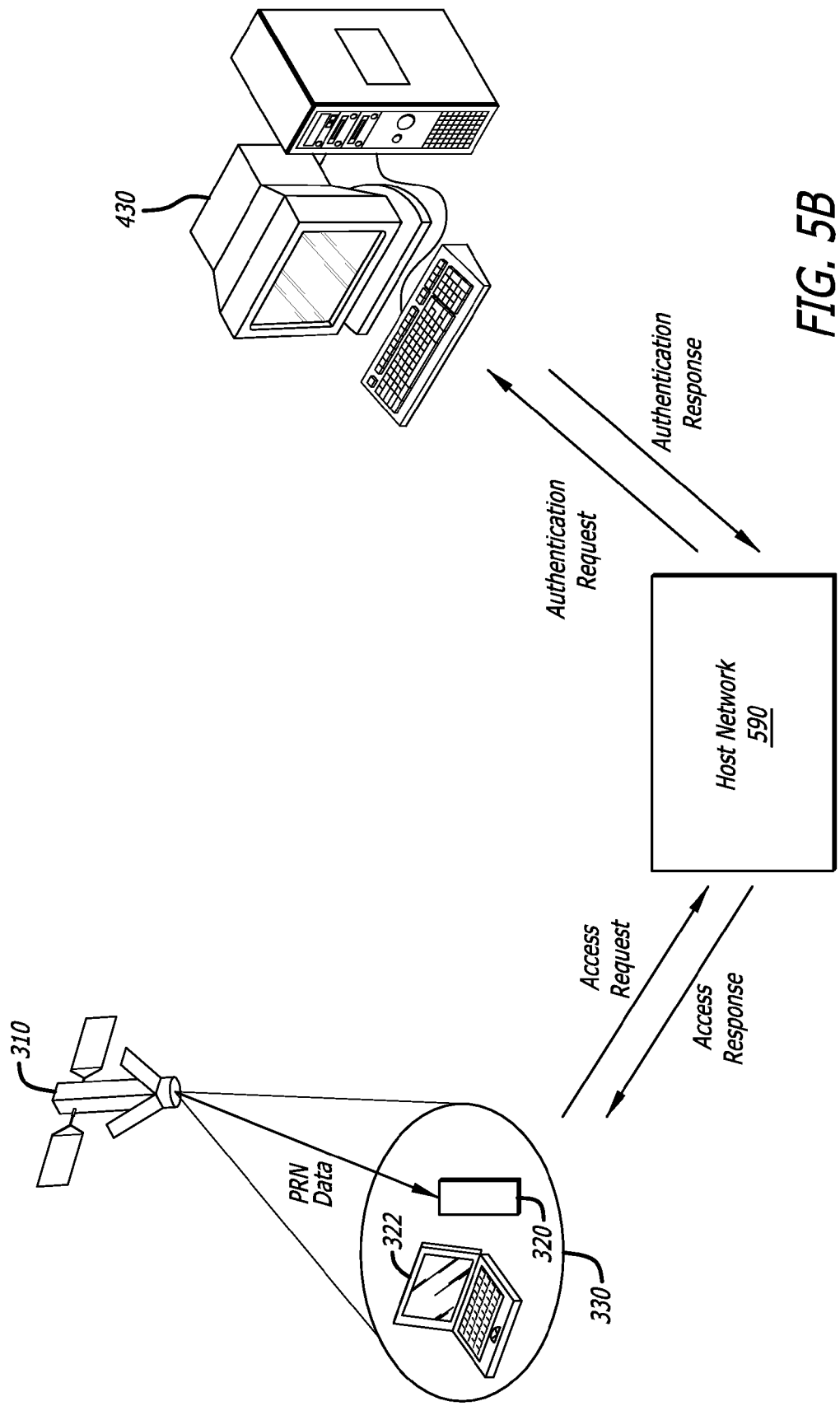

SIGNIFICANT RANDOM NUMBER GENERATOR

CROSS-REFERENCE TO RELATED APPLICATION

This application is a Continuation-In-Part application of, and claims the benefit of U.S. patent application Ser. No. 12/949,404, filed Nov. 18, 2010, which is hereby incorporated by reference in its entirety.

BACKGROUND

The present disclosure relates to number generators. In particular, it relates to random number generators.

SUMMARY

The present disclosure relates to a method, system, and apparatus for a random number generator. In particular, the present disclosure teaches a significant random number generator that produces a sequence of numbers that are significantly random. In one or more embodiments, a method for the disclosed significant random number generator uses physical phenomena that occurs in space. The disclosed method involves sensing, with a sensor on a spacecraft, at least one physical phenomenon. The method further involves outputting, from the sensor, a value for at least one physical phenomenon. Also, the method involves inputting at least a portion of the value of at least one physical phenomenon into a pseudo-random number generator (PRNG). In addition, the method involves generating, with the PRNG, a sequence of random numbers using the value of the at least one physical phenomenon as at least one seed for the PRNG. Additionally, the method involves outputting, from the PRNG, the sequence of the random numbers. It should be noted that in various different embodiments of the disclosed method, various different types of random number generators may be employed instead of a PRNG.

In one or more embodiments, the physical phenomenon is atmospheric temperature, temperature of the spacecraft, atmospheric pressure, resistance of a resistor on the spacecraft, thermal noise, radio frequency (RF) noise, shot noise produced from a reversed biased diode that may optionally be used with an analog-to-digital (A/D) converter, white noise produced from an A/D converter, arrival of a photon from a star, a fluctuation of a voltage of a unit on the spacecraft, a fluctuation of a voltage of a resistor on the spacecraft, a fluctuation of a temperature of a unit on the spacecraft, the magnetic field of a unit on the spacecraft, and/or radioactive decay of a radioactive material on the spacecraft. In at least one embodiment, the disclosed method further involves inputting, into a transmitter, the sequence of the random numbers; and transmitting, from the transmitter, the sequence of the random numbers. In some embodiments, the transmitter is a radio frequency (RF) antenna.

In at least one embodiment, the method further involves determining, by a processor, whether an event occurs that indicates to obtain at least one new seed to input into the PRNG. In some embodiments, the method further involves sensing, with the sensor, at least one physical phenomenon again to obtain a new value for at least one physical phenomenon to be used by the PRNG as at least one new seed, when the processor determines that the event has occurred. In one or more embodiments, the event is a predetermined time interval, a random time interval, a time interval that is dependent upon the sequence of the random numbers, related to an occurrence of a certain value of the random numbers, related to an occurrence of a certain value of the physical phenomenon that is sensed, related to an occurrence of a certain amount of change in the value of the physical phenomenon that is sensed, and/or an authentication request.

In one or more embodiments, the spacecraft is a satellite or a pseudo-satellite. In at least one embodiment, the satellite is a low Earth orbiting (LEO) satellite, a medium Earth orbiting (MEO) satellite, or a geosynchronous Earth orbiting (GEO) satellite. In some embodiments, the LEO satellite is an Iridium satellite. In one or more embodiments, the PRNG is located on one of the spacecraft and a terrestrial location.

In at least one embodiment, a system for generating random numbers using physical phenomena occurring in space involves a sensor and a pseudo-random number generator (PRNG). In one or more embodiments, the sensor, which is located on a spacecraft, is configured to sense at least one physical phenomenon, and to output a value for at least one physical phenomenon. In at least one embodiment, the pseudo-random number generator is configured to use at least a portion of the value of at least one physical phenomenon as at least one seed for generating a sequence of random numbers, and to output the sequence of the random numbers. It should be noted that in various different embodiments of the disclosed system, various different types of random number generators may be employed by the system instead of a PRNG.

In one or more embodiments, the system further involves a transmitter configured to transmit the sequence of the random numbers that are outputted from the PRNG. In some embodiments, the transmitter is a radio frequency (RF) antenna.

In at least one embodiment, the system further involves a processor configured to determine whether an event occurs that indicates to obtain at least one new seed to input into the PRNG. In one or more embodiments, the sensor is further configured to sense at least one physical phenomenon again to obtain a new value for at least one physical phenomenon to be used by the PRNG as at least one new seed, when the processor determines that the event has occurred.

In one or more embodiments, a method to authenticate a claimant using the disclosed significant random number generator involves sensing, from a sensor on a spacecraft, a physical phenomenon. The method further involves outputting, from the sensor, a value for the physical phenomenon. In addition, the method involves inputting the value of the physical phenomenon into a pseudo-random number generator (PRNG) on the spacecraft. The method further involves generating, with the PRNG, a sequence of random numbers using the value of the physical phenomenon as a seed for the PRNG. Also, the method involves outputting, from the PRNG, the sequence of the random numbers.

Additionally, the method involves inputting, into a transmitter on the spacecraft, the sequence of the random numbers. Also, the method involves transmitting, from the transmitter, the sequence of the random numbers. In addition, the method involves receiving, from a receiver associated with the claimant, the sequence of the random numbers. In at least one embodiment, the claimant is an entity and/or a user. Additionally, the method involves receiving, from a computing device, the sequence of the random numbers. Also, the method involves comparing, with a processor, the sequence of the random numbers received by the claimant and the sequence of the random numbers received by the computing device. Further, the method involves authenticating the claimant when a difference between the sequence of the random numbers received by the claimant and the sequence of the random numbers received by the computing device is less than a threshold.

In one or more embodiments, the disclosed method employs an Iridium LEO satellite for the spacecraft. Each of the satellites in the Iridium LEO satellite constellation has an antenna geometry that transmits forty-eight (48) spot beams with a distinctive spot beam pattern. In at least one embodiment, the sequence of random numbers and/or the value of the physical phenomenon is transmitted from one of the Iridium satellites in the constellation. The forty-eight (48) spot beams of an Iridium satellite may be used to transmit localized signals, which contain the sequence of random numbers and/or the value of the physical phenomenon, to receiving sources located on or near the Earth's surface. Each of the spot beams may contain different sequences of random numbers (i.e. different PRNGs and/or different seeds utilized by a single PRNG are used to generate the different sequences), different values of the physical phenomenon (i.e. the different values are obtained by the physical phenomenon being sensed at different times), and/or different values for different types of phenomena being sensed by different sensors the spacecraft. It should be noted that when employing one of the above-described Iridium LEO satellites, the transmission signal power is sufficiently strong enough to allow for the signal to penetrate into an indoor environment. This allows for the disclosed method to be used for many indoor applications.

In at least one embodiment, another method to authenticate a claimant using the disclosed significant random number generator involves sensing, from a sensor on a spacecraft, a physical phenomenon. Also, the method involves outputting, from the sensor, a value for the physical phenomenon. The method further involves inputting the value of the physical phenomenon into a pseudo-random number generator (PRNG) on the spacecraft. In addition, the method involves generating, with the PRNG on the spacecraft, a first sequence of random numbers using the value of the physical phenomenon as a seed for the PRNG on the spacecraft. Additionally, the method involves outputting, from the PRNG on the spacecraft, the first sequence of the random numbers. Also, the method involves inputting, into a transmitter on the spacecraft, the first sequence of the random numbers. In addition, the method involves transmitting, from the transmitter, the first sequence of the random numbers. Additionally, the method involves receiving, from a receiver associated with the claimant, the first sequence of the random numbers.

In addition, the method involves inputting, into the transmitter on the spacecraft, the value of the physical phenomenon. Also, the method involves transmitting, from the transmitter, the value of the physical phenomenon. In addition, the method involves receiving, from a computing device, the value of the physical phenomenon. Additionally, the method involves inputting the value of the physical phenomenon into a pseudo-random number generator (PRNG) associated with the computing device. Also, the method involves generating, with the PRNG associated with the computing device, a second sequence of random numbers using the value of the physical phenomenon as a seed for the PRNG associated with the computing device. In addition, the method involves outputting, from the PRNG associated with the computing device, the second sequence of the random numbers. Also, the method involves comparing, with a processor, the first sequence of the random numbers and the second sequence of the random numbers.

Further, the method involves authenticating the claimant when a difference between the first sequence of the random numbers and the second sequence of the random numbers is less than a threshold.

In one or more embodiments, a method for a secure communication using the disclosed significant random number generator involves sensing, from a sensor on a spacecraft, a physical phenomenon. Further, the method involves outputting, from the sensor, a value for the physical phenomenon. Also, the method involves inputting, into a transmitter on the spacecraft, the value of the physical phenomenon. In addition, the method involves transmitting, from the transmitter, the value of the physical phenomenon. Additionally, the method involves receiving, from a receiver associated with a claimant, the value of the physical phenomenon. Also, the method involves inputting the value of the physical phenomenon into a pseudo-random number generator (PRNG). In addition, the method involves generating, with the PRNG, a sequence of random numbers using the value of the physical phenomenon as a seed for the PRNG. Also, the method involves outputting, from the PRNG, the sequence of the random numbers. Further, the method involves encrypting and decrypting data, with a processor, using the sequence of the random numbers as a key.

In at least one embodiment, a method for routing network traffic using the disclosed significant random number generator involves sensing, from a sensor on a spacecraft, a physical phenomenon. The method further involves outputting, from the sensor, a value for the physical phenomenon. Also, the method involves inputting, into a transmitter on the spacecraft, the value of the physical phenomenon. In addition, the method involves transmitting, from the transmitter, the value of the physical phenomenon. Additionally, the method involves receiving, from a computing device, the value of the physical phenomenon. Also, the method involves inputting the value of the physical phenomenon into a pseudo-random number generator (PRNG). In addition, the method involves generating, with the PRNG, a sequence of random numbers using the value of the physical phenomenon as a seed for the PRNG. Also, the method involves outputting, from the PRNG, the sequence of the random numbers. Additionally, the method involves generating, with a processor, routing instructions using the sequence of the random numbers. Further, the method involves routing network traffic, with at least one router, through a plurality of nodes with the routing instructions.

In one or more embodiments, a method for anti-jamming using the disclosed significant random number generator involves sensing, from a sensor on a spacecraft, a physical phenomenon. The method further involves outputting, from the sensor, a value for the physical phenomenon. Also, the method involves inputting, into a transmitter on the spacecraft, the value of the physical phenomenon. In addition, the method involves transmitting, from the transmitter, the value of the physical phenomenon. Additionally, the method involves receiving, from a receiver, the value of the physical phenomenon. Also, the method involves distributing, by a network distributor, the value of the physical phenomenon to a plurality of communication nodes. In addition, the method involves inputting the value of the physical phenomenon into a pseudo-random number generator (PRNG) associated with each of the communication nodes. Also, the method involves generating, with each of the PRNGs, a sequence of random numbers using the value of the physical phenomenon as a seed for the PRNGs. In addition, the method involves outputting, from the PRNGs, the sequence of the random numbers. Further, the method involves generating, with a processor associated with each of the communication nodes, an anti-jamming sequence using the sequence of the random numbers generated from the respective PRNG.

In at least one embodiment, a method for certified time stamping using the disclosed significant random number generator involves sensing, from a sensor on a spacecraft, a physical phenomenon. The method further involves outputting, from the sensor, a value for the physical phenomenon. Also, the method involves inputting, into a transmitter on the spacecraft, the value of the physical phenomenon. In addition, the method involves transmitting, from the transmitter, the value of the physical phenomenon. Additionally, the method involves receiving, from a receiver, the value of the physical phenomenon. Also, the method involves inputting the value of the physical phenomenon into a pseudo-random number generator (PRNG). In addition, the method involves generating, with the PRNG, a sequence of random numbers using the value of the physical phenomenon as a seed for the PRNG. Also, the method involves outputting, from the PRNG, the sequence of the random numbers. Additionally, the method involves generating, with a computing device, an electronic document. In addition, the method involves creating, with a processor, a certified time stamp for the electronic document. Further, the method involves encrypting, with the processor, the certified time stamp using the sequence of the random numbers as a key.

In one or more embodiments, a method for secure identification of a claimant using the disclosed significant random number generator involves sensing, from a sensor on a spacecraft, a physical phenomenon. The method further involves outputting, from the sensor, a value for the physical phenomenon. Also, the method involves inputting, into a transmitter on the spacecraft, the value of the physical phenomenon. In addition, the method involves transmitting, from the transmitter, the value of the physical phenomenon. Additionally, the method involves receiving, from a receiver associated with the claimant, the value of the physical phenomenon. In addition, the method involves inputting the value of the physical phenomenon into a pseudo-random number generator (PRNG) to be used as a first seed by the PRNG. Additionally, the method involves generating, with the PRNG, a sequence of random numbers using the first seed and a second seed associated with the claimant. Also, the method involves outputting, from the PRNG, the sequence of the random numbers. In addition, the method involves authenticating, by a verifier device, the claimant by verifying the sequence of the random numbers. Further, the method involves accessing, by the claimant, the secure network when the sequence of the random numbers is verified.

The features, functions, and advantages can be achieved independently in various embodiments of the present inventions or may be combined in yet other embodiments.

DRAWINGS

These and other features, aspects, and advantages of the present disclosure will become better understood with regard to the following description, appended claims, and accompanying drawings where:

Figure 4A:
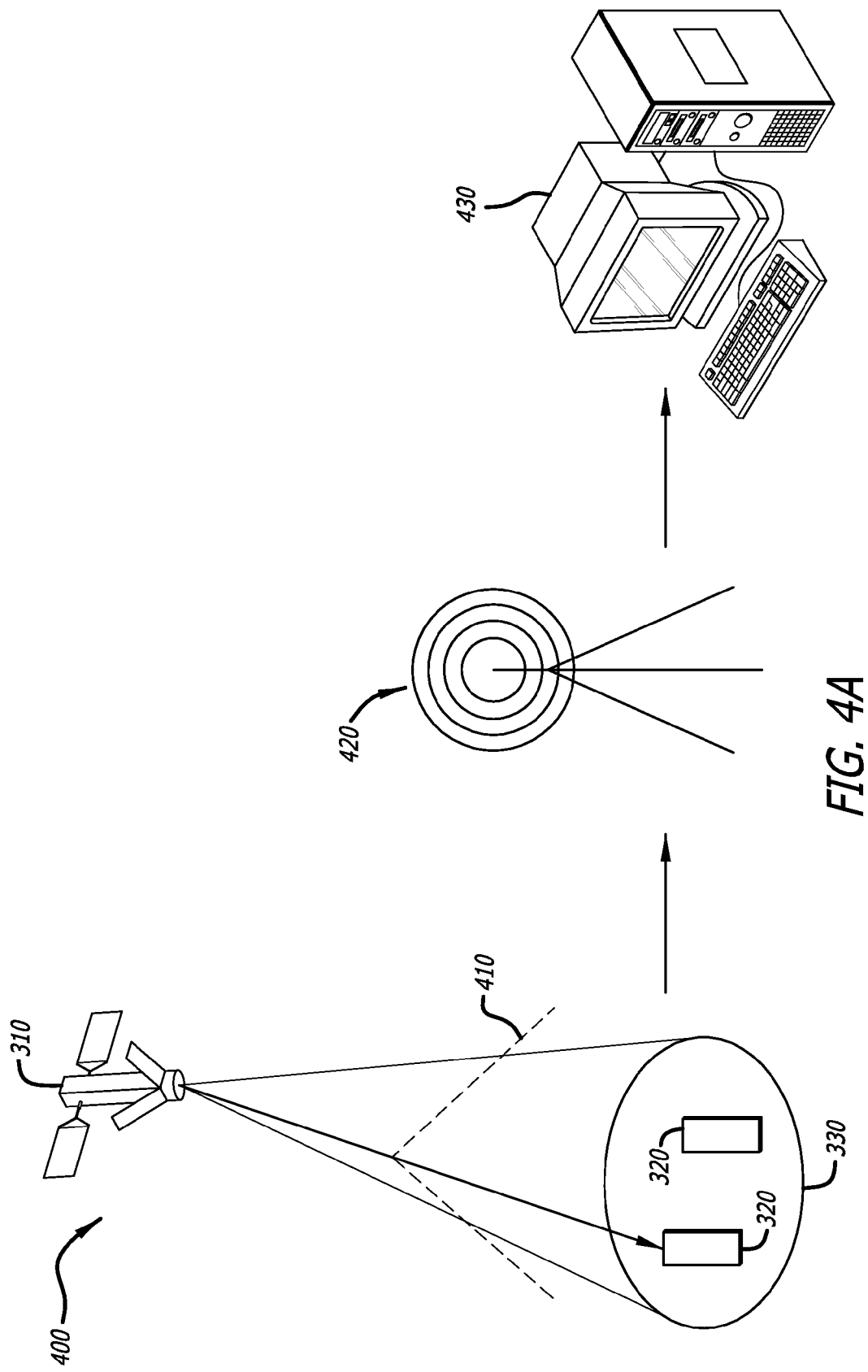

FIGS. 4A, 4B, and 4C are schematic diagrams illustrating satellite-based authentications systems, in accordance with at least one embodiment of the present disclosure.

Figure 5A:
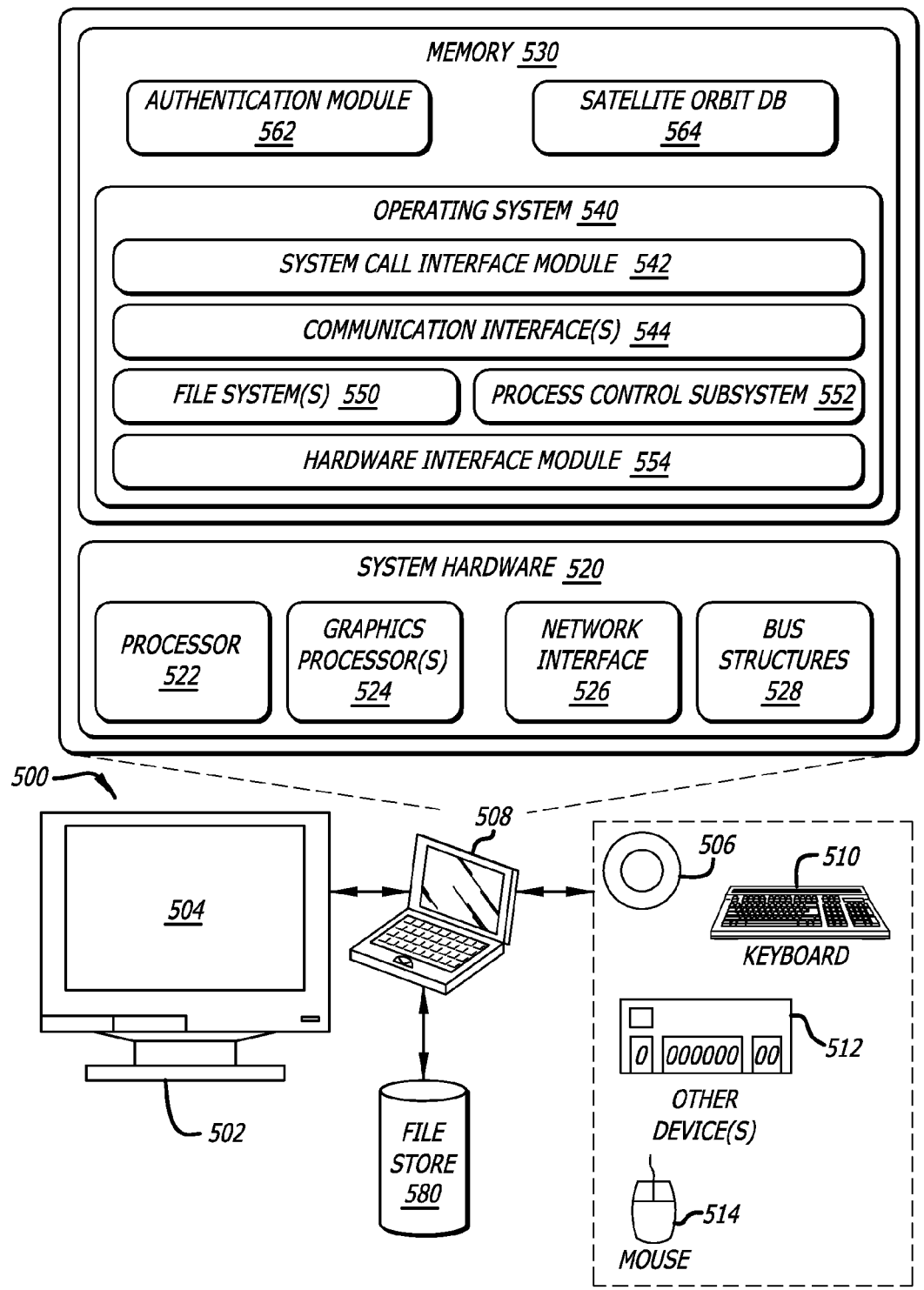

FIG. 5A is a schematic diagram of a computing device which may be adapted to implement the disclosed satellite-based authentication system, in accordance with at least one embodiment of the present disclosure.

FIG. 5B is a schematic diagram of a satellite-based communication system that may be employed by the disclosed spot beam based authentication system, in accordance with at least one embodiment of the present disclosure.

Figure 6:
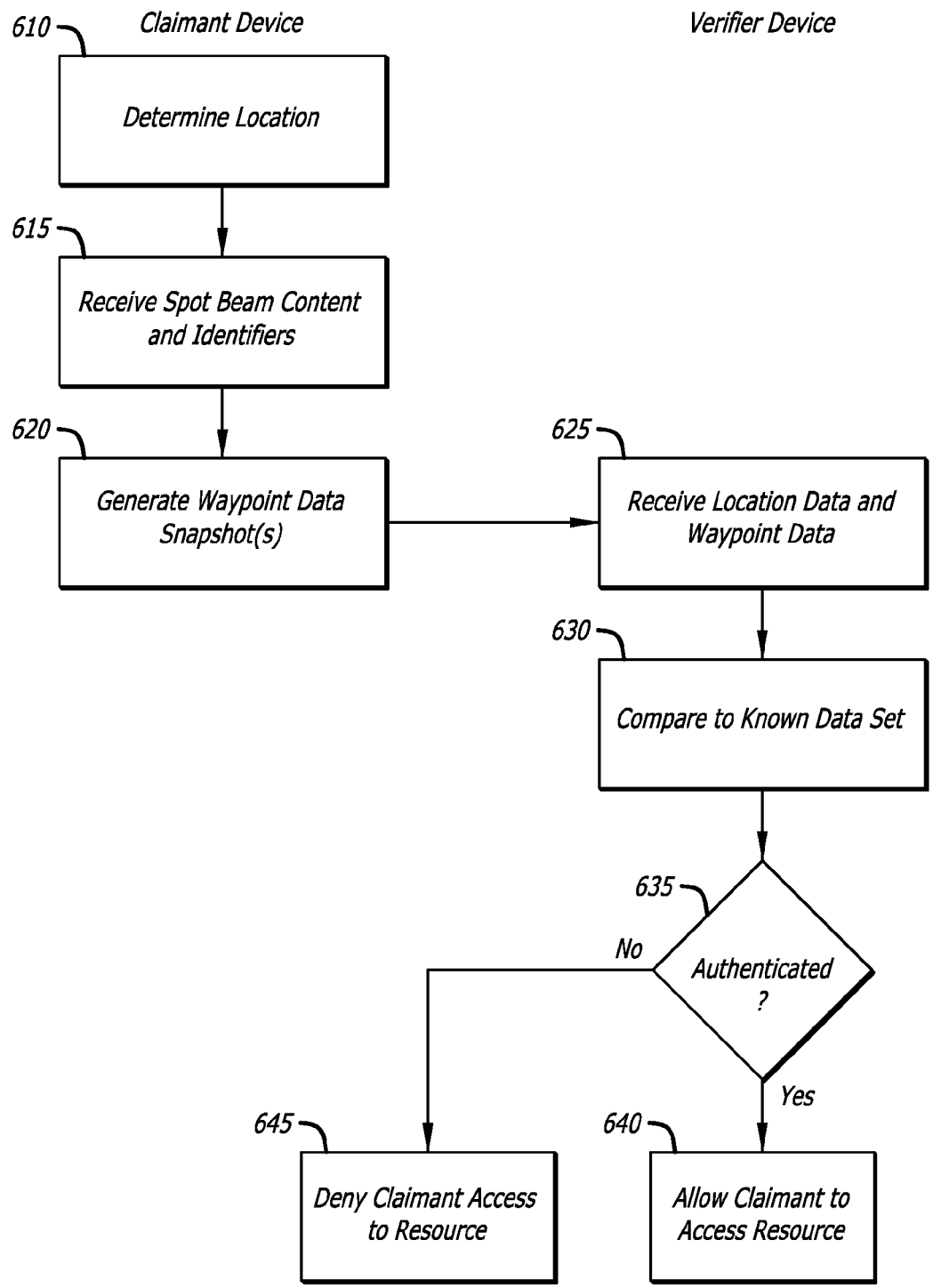

FIG. 6 is a flow diagram showing the disclosed spot beam based authentication method to authenticate a claimant, in accordance with at least one embodiment of the present disclosure.

Figure 7A:
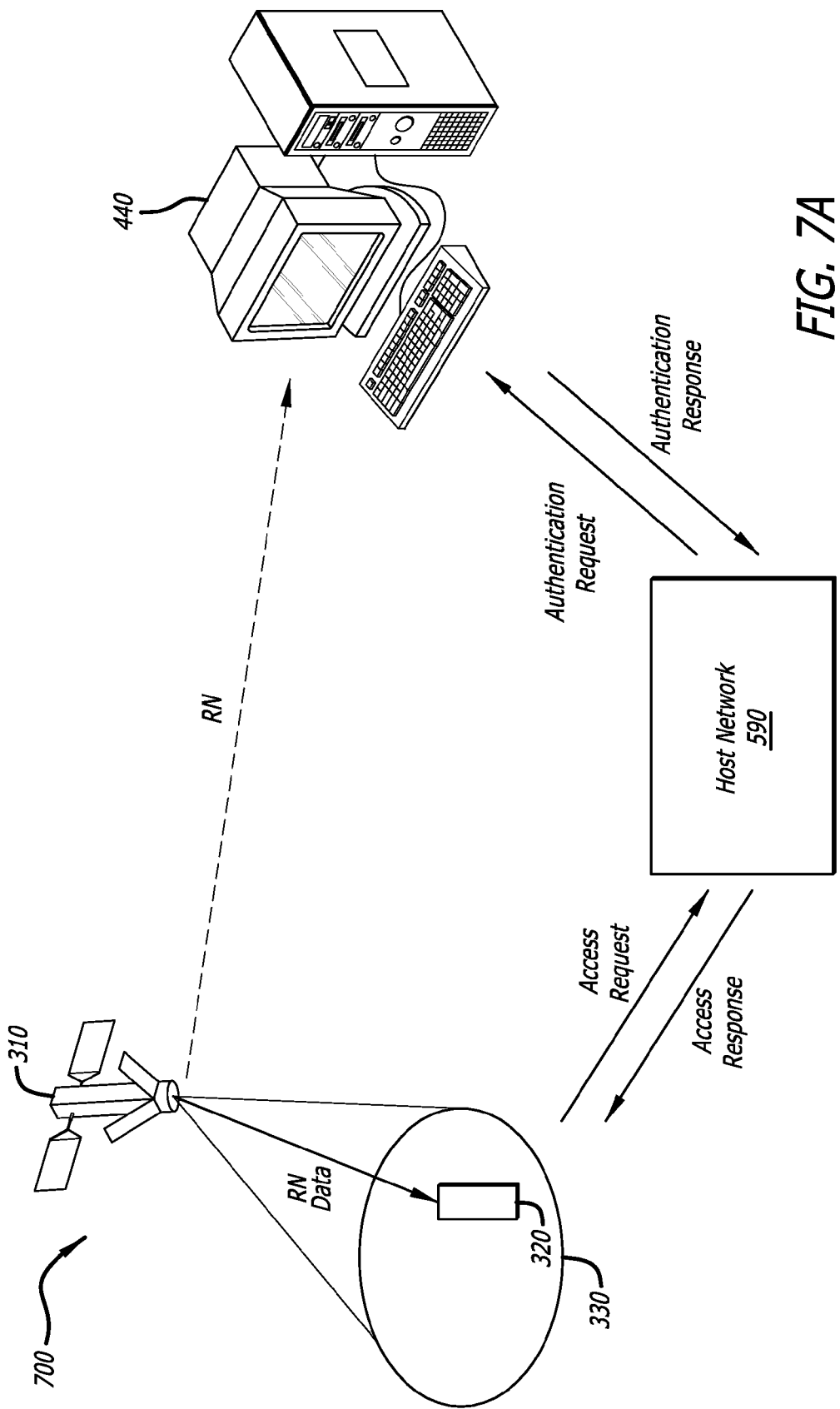

FIG. 7A is a diagram of a first embodiment the disclosed spot beam based authentication system employing the disclosed significant random number generator, in accordance with at least one embodiment of the present disclosure.

Figure 7B:
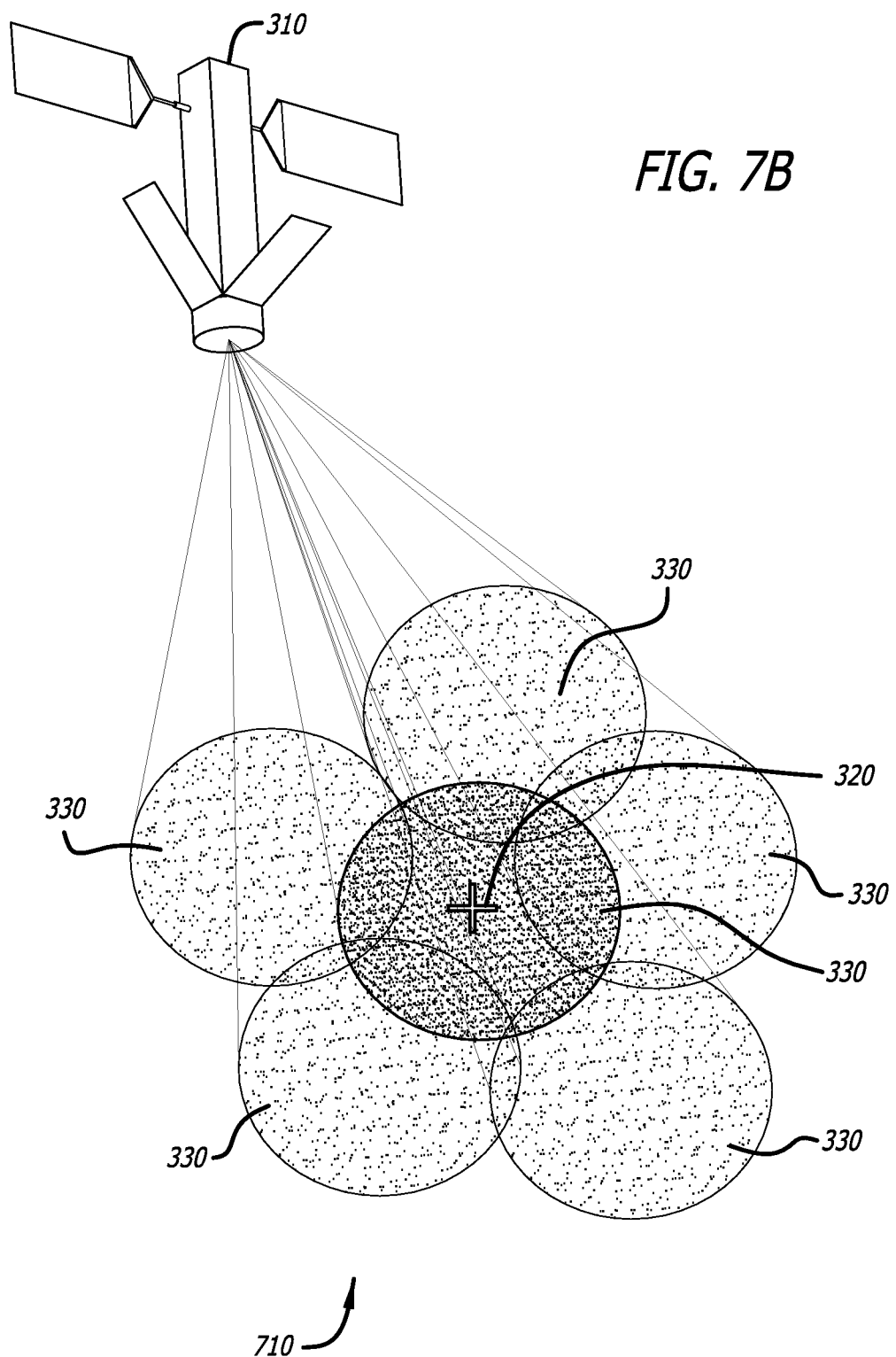

FIG. 7B is a diagram of a satellite employed by the disclosed system transmitting a plurality of spot beams where each spot beam has a different sequence of random numbers, in accordance with at least one embodiment of the present disclosure.

Figure 8:
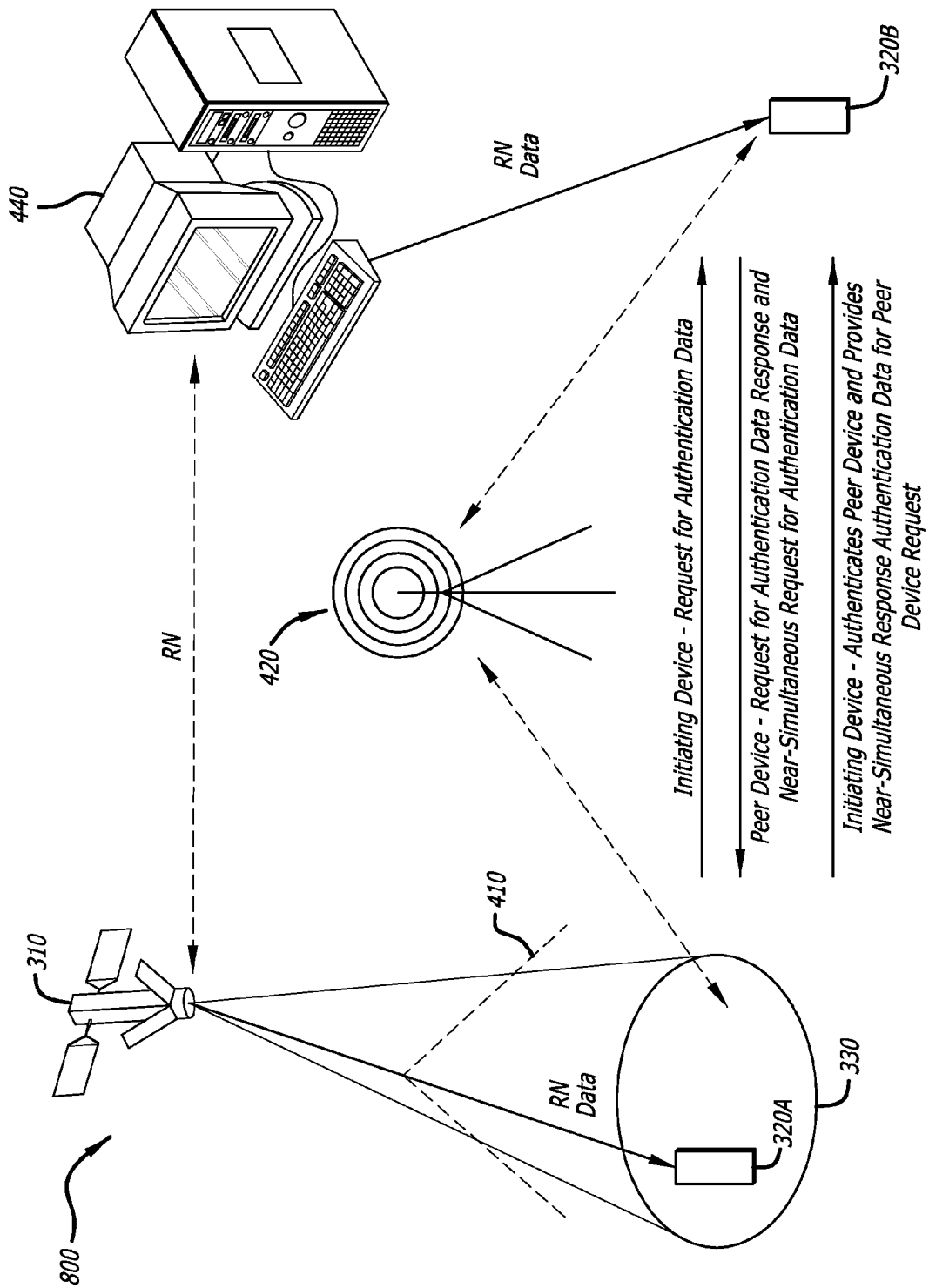

FIG. 8 is a diagram of a second embodiment the disclosed spot beam based authentication system employing the disclosed significant random number generator, in accordance with at least one embodiment of the present disclosure.

Figure 9:
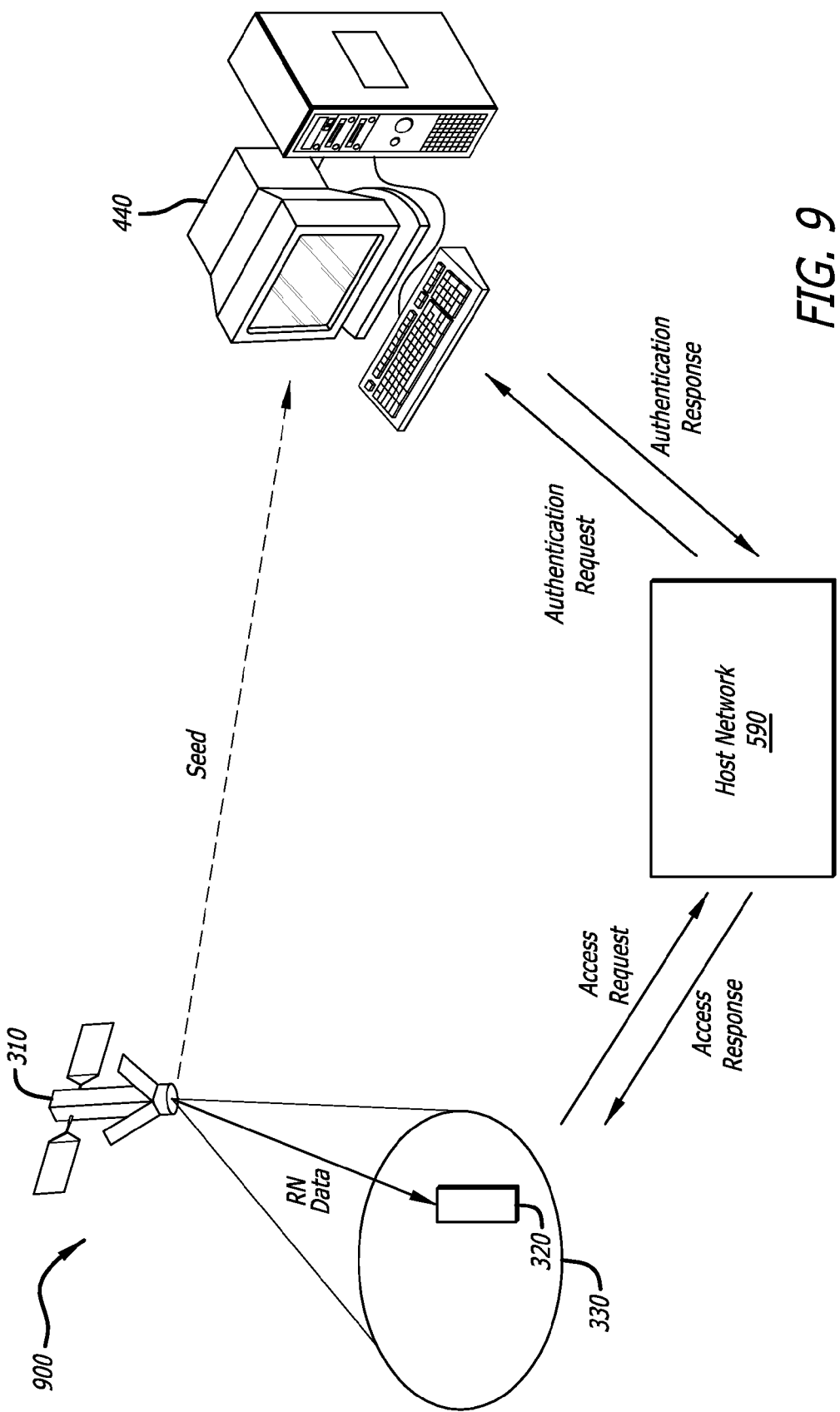

FIG. 9 is a diagram of a third embodiment the disclosed spot beam based authentication system employing the disclosed significant random number generator, in accordance with at least one embodiment of the present disclosure.

Figure 10:
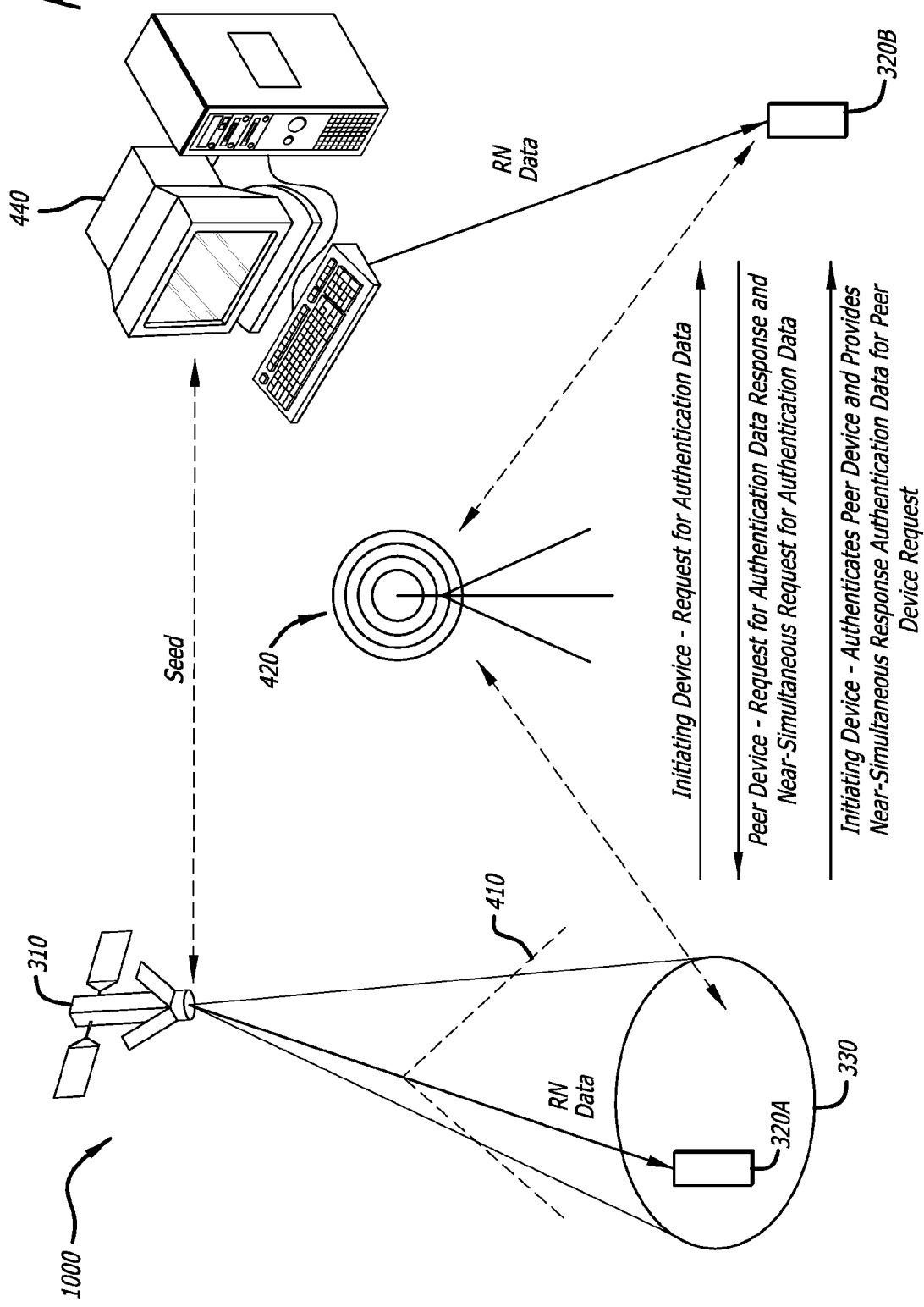

FIG. 10 is a diagram of a fourth embodiment the disclosed spot beam based authentication system employing the disclosed significant random number generator, in accordance with at least one embodiment of the present disclosure.

Figure 11:
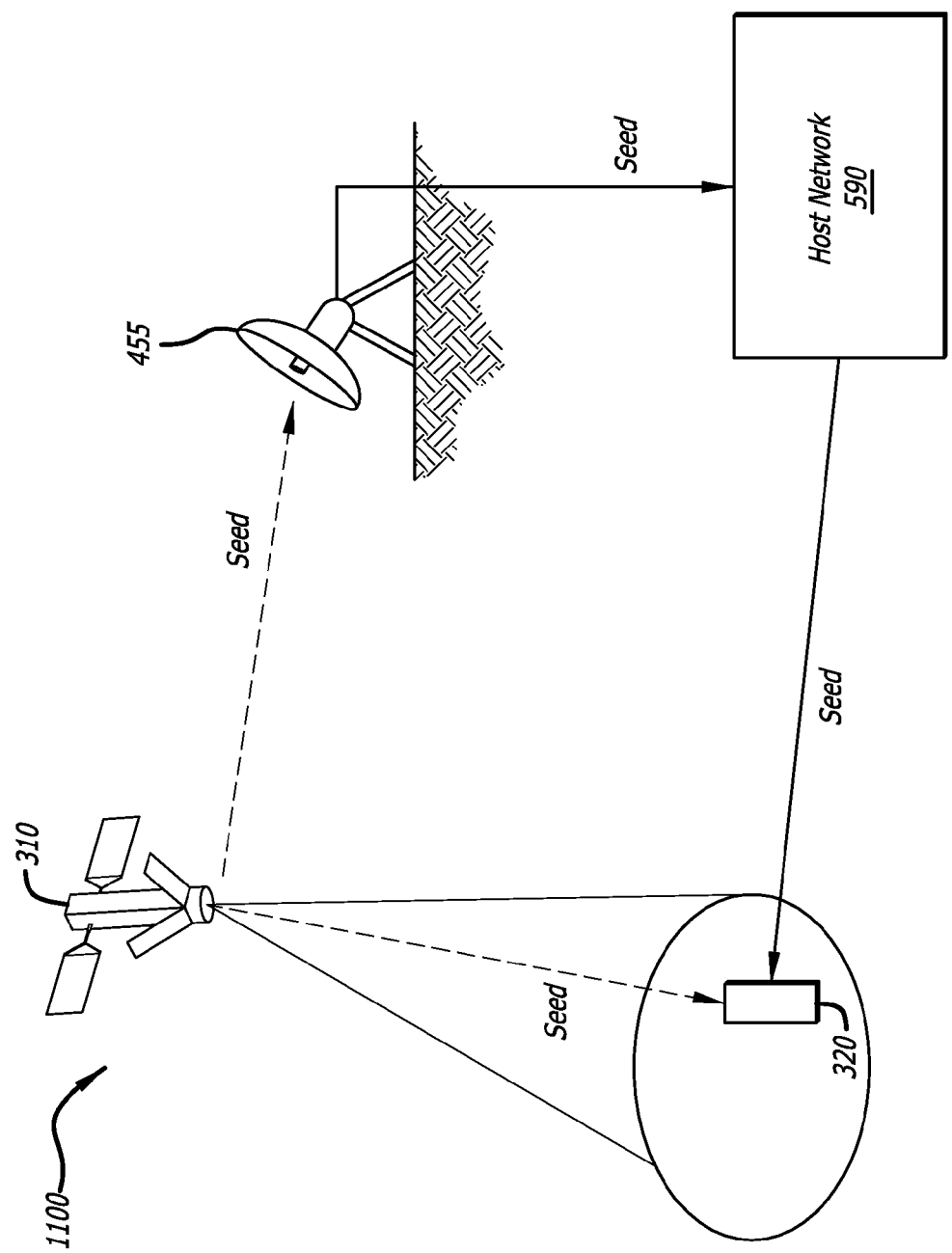

FIG. 11 is diagram of a cryptography system employing the disclosed significant random number generator, in accordance with at least one embodiment of the present disclosure.

Figure 12:
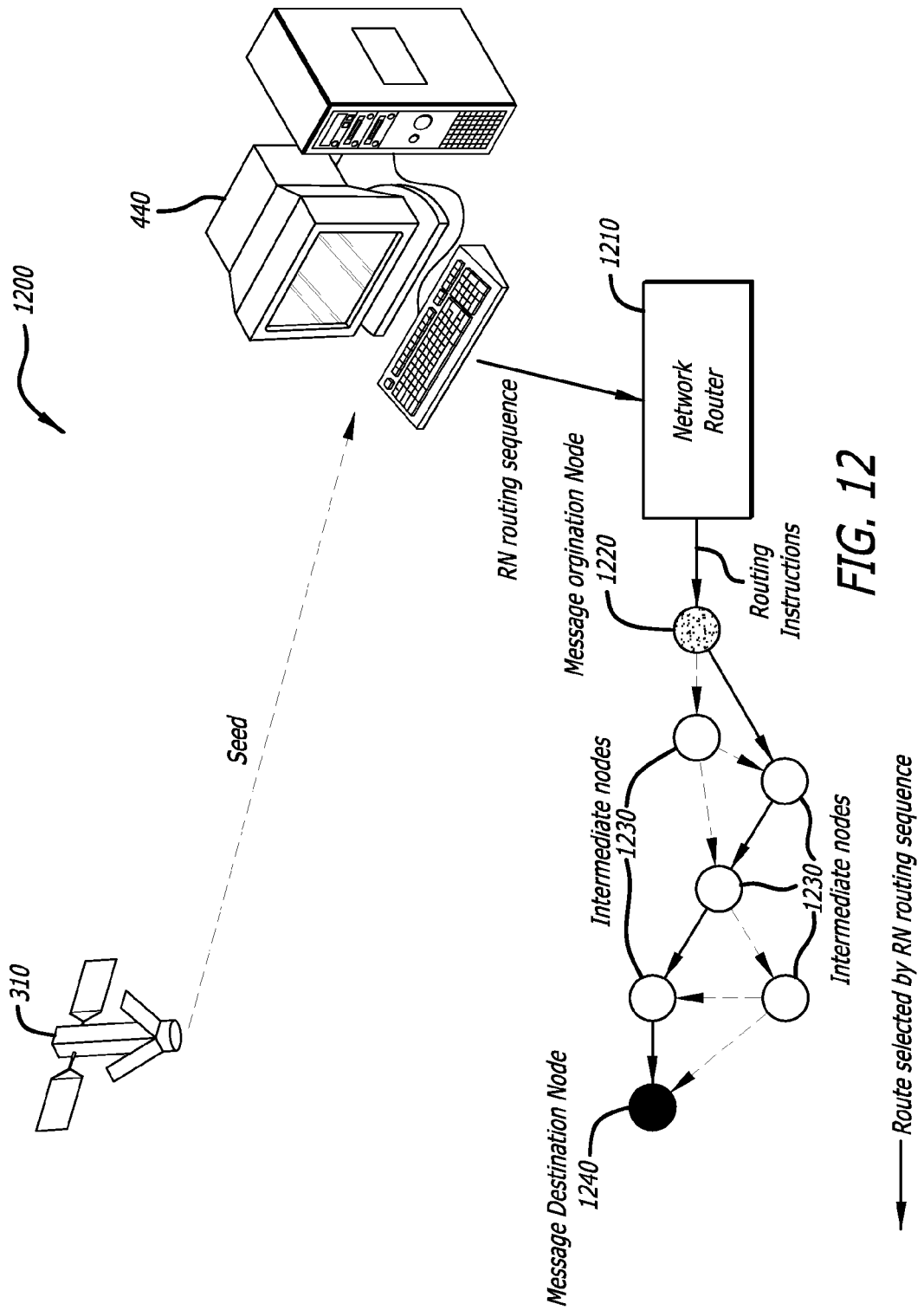

FIG. 12 is a diagram of a system for routing network traffic employing the disclosed significant random number generator, in accordance with at least one embodiment of the present disclosure.

Figure 13:
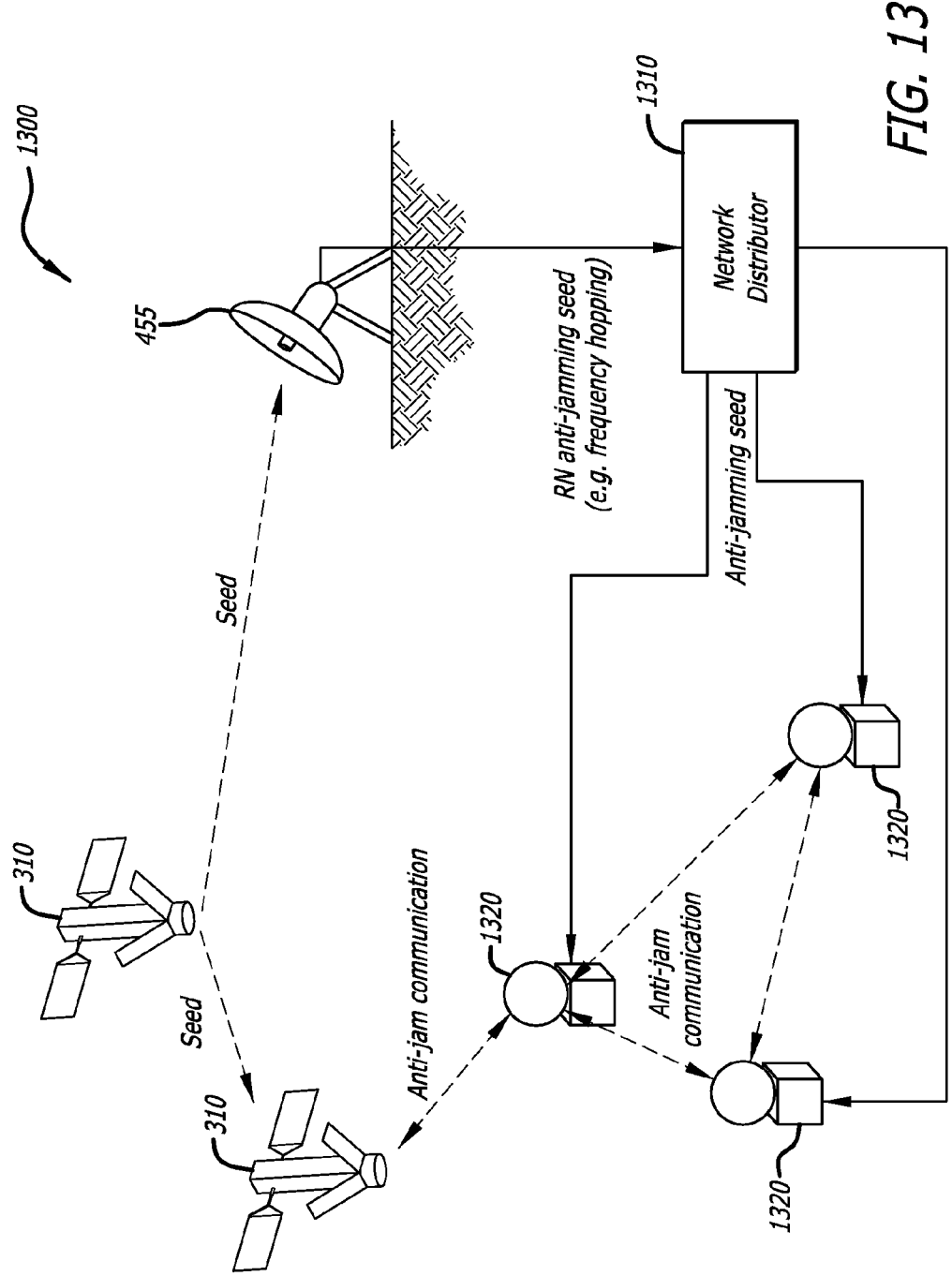

FIG. 13 is a diagram of a system for anti-jamming employing the disclosed significant random number generator, in accordance with at least one embodiment of the present disclosure.

Figure 14:
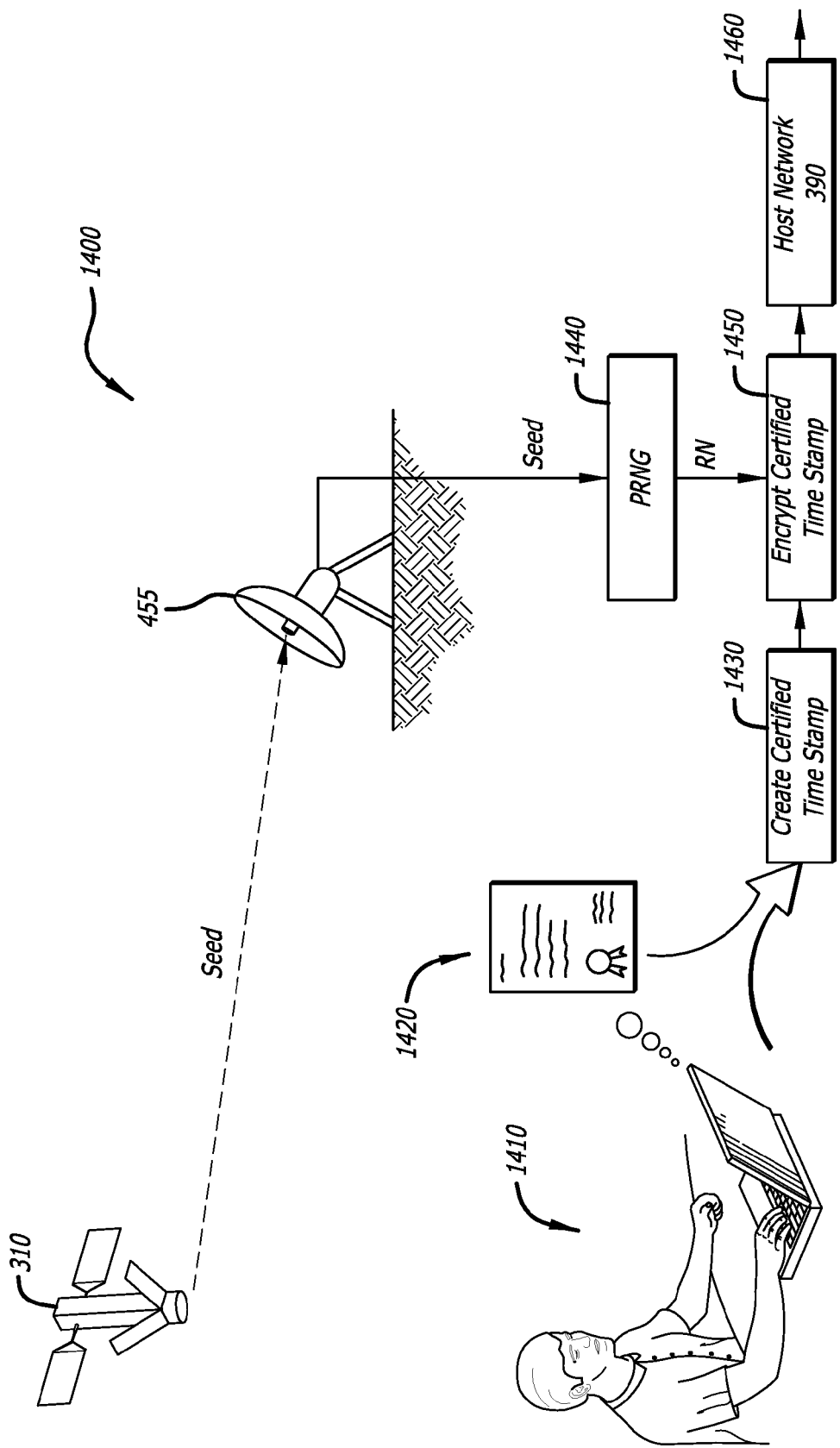

FIG. 14 is a diagram of a system for certified time stamping employing the disclosed significant random number generator, in accordance with at least one embodiment of the present disclosure.

Figure 15:
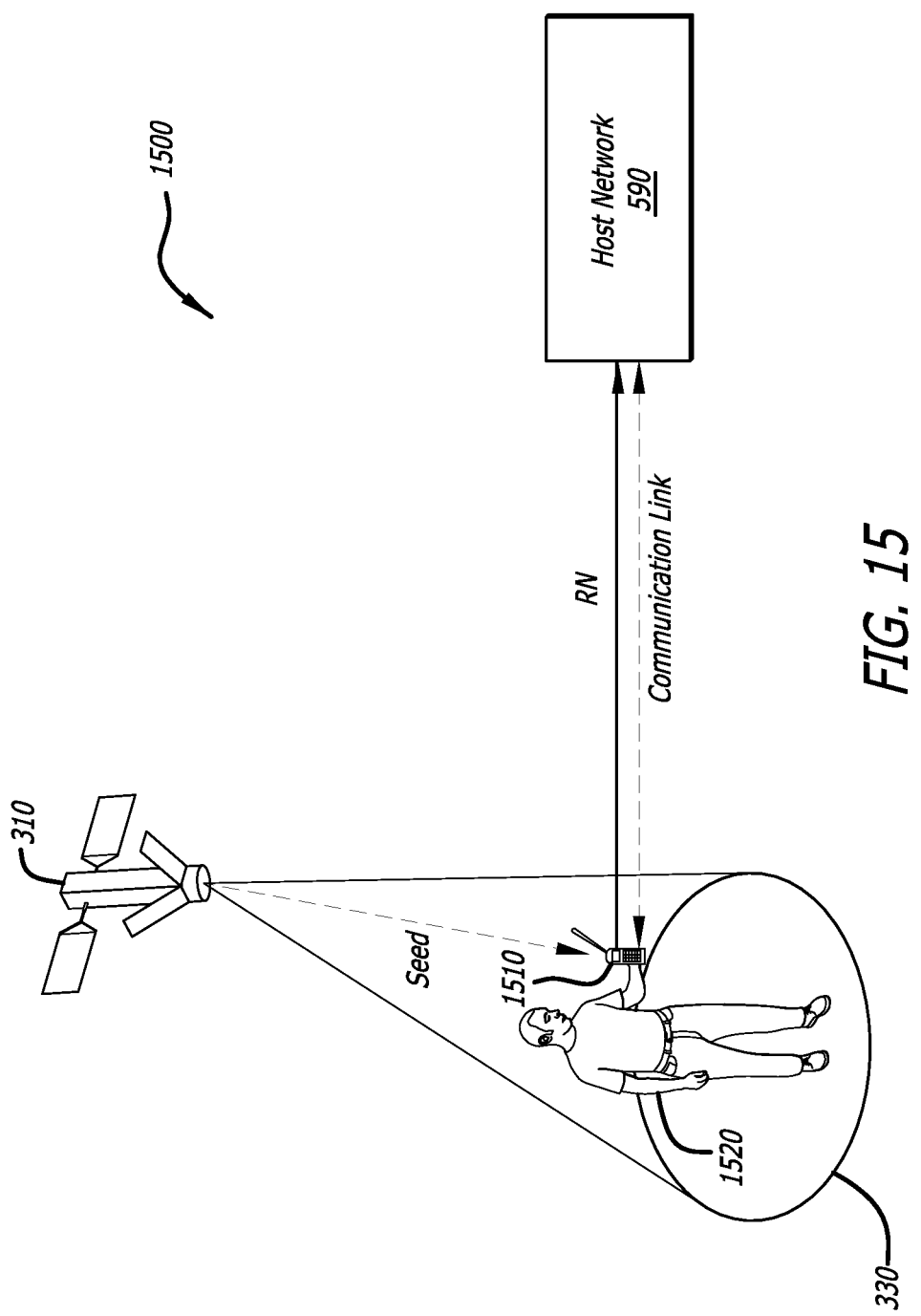

FIG. 15 is a diagram of a system for secure identification (ID) employing the disclosed significant random number generator, in accordance with at least one embodiment of the present disclosure.

DESCRIPTION

The methods and apparatus disclosed herein provide an operative system for a significant random number generator (RNG) that produces a sequence of random numbers that is significantly random. Specifically, this system relates to a significant a random number generator that utilizes physical phenomena that occurs in space. A value for the physical phenomena sensed in space is used as a seed for a pseudo-random number generator (PRNG) to produce a significantly random sequence of random numbers. The disclosed significant random number generator may be employed by a number of different types of applications including, but not limited to, an authentication application, a cryptology application, a routing network traffic application, an anti-jamming application, a certified time stamping application, and a secure identification application. Details of the disclosed significant random number generator as well as some of its related applications are described below.

In the following description, numerous details are set forth in order to provide a more thorough description of the system. It will be apparent, however, to one skilled in the art, that the disclosed system may be practiced without these specific details. In the other instances, well known features have not been described in detail so as not to unnecessarily obscure the system.

Figure 1:
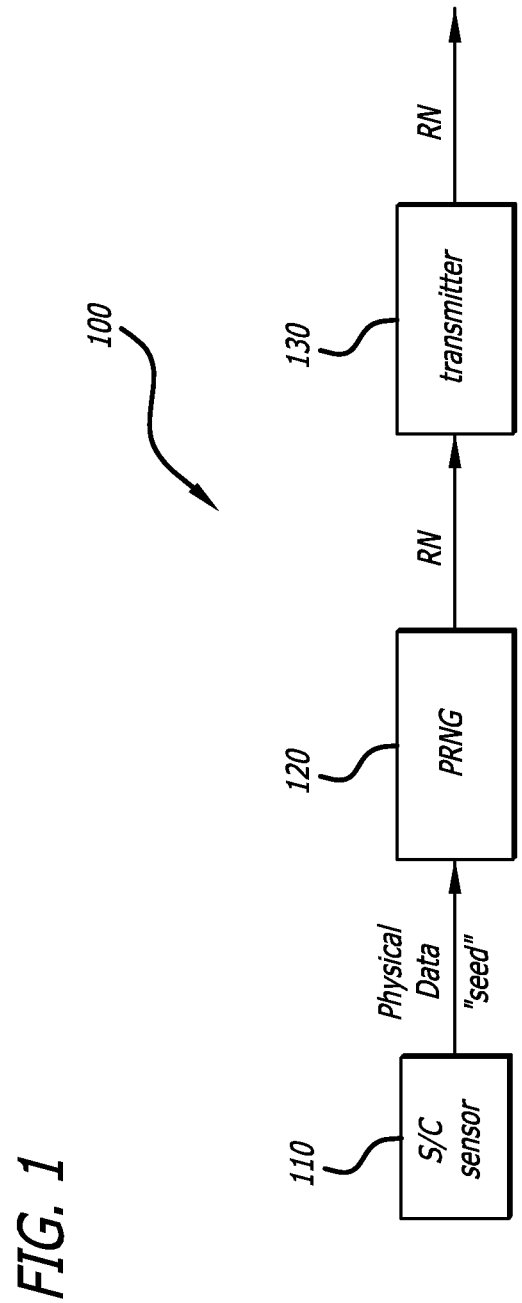
FIG. 1 is a simplified block diagram of the disclosed significant random number generator (RNG), in accordance with at least one embodiment of the present disclosure.

FIG. 1 is a simplified block diagram of the disclosed significant random number generator (RNG) 100, in accordance with at least one embodiment of the present disclosure. In this figure, a sensor 110, which is located on a spacecraft (S/C) (not shown), senses a particular type of physical phenomenon at a particular time(s) and/or over a duration of time. Various types of physical phenomenon can be sensed by the sensor including, but not limited to, atmospheric temperature, temperature of the spacecraft, atmospheric pressure, resistance of a resistor on the spacecraft, thermal noise, radio frequency (RF) noise, shot noise produced from a reversed biased diode, white noise produced from an analog-to-digital (A/D) converter, arrival of a photon from a star, a fluctuation of a voltage of a unit on the spacecraft, a fluctuation of a voltage of a resistor on the spacecraft, a fluctuation of a temperature of a unit on the spacecraft, and/or radioactive decay of a radioactive material on the spacecraft. In addition, it should be noted that various types of satellites and/or pseudo satellites may be employed by the disclosed system for the spacecraft, including, but not limited to, LEO satellites, MEO satellites, and GEO satellites. In particular, an Iridium LEO satellite may be utilized by the system for the disclosed spacecraft.

The sensor outputs a value for the physical phenomenon that was sensed or outputs a stream of values for the physical phenomenon that was sensed over a duration of time. In this figure, the value of the physical phenomenon is shown to be inputted into a pseudo-random number generator (PRNG) 120 from the output of the sensor 110. In one or more embodiments, the PRNG 120 is located on the spacecraft or at a terrestrial location.

The PRNG uses at least a portion of the value of the physical phenomenon as a seed in order to generate a sequence of random numbers. It should be noted that in some embodiments, multiple seeds are used by the PRNG 120 to generate the sequence of random numbers. The sequence of random numbers is then outputted from the PRNG 120, and inputted into a transmitter 130. The transmitter 130 transmits the sequence of random numbers. In at least one embodiment, the transmitter 130 is a radio frequency (RF) antenna. Similar to the PRNG 120, the transmitter 130 is located on the spacecraft or at a terrestrial location.

Figure 2:
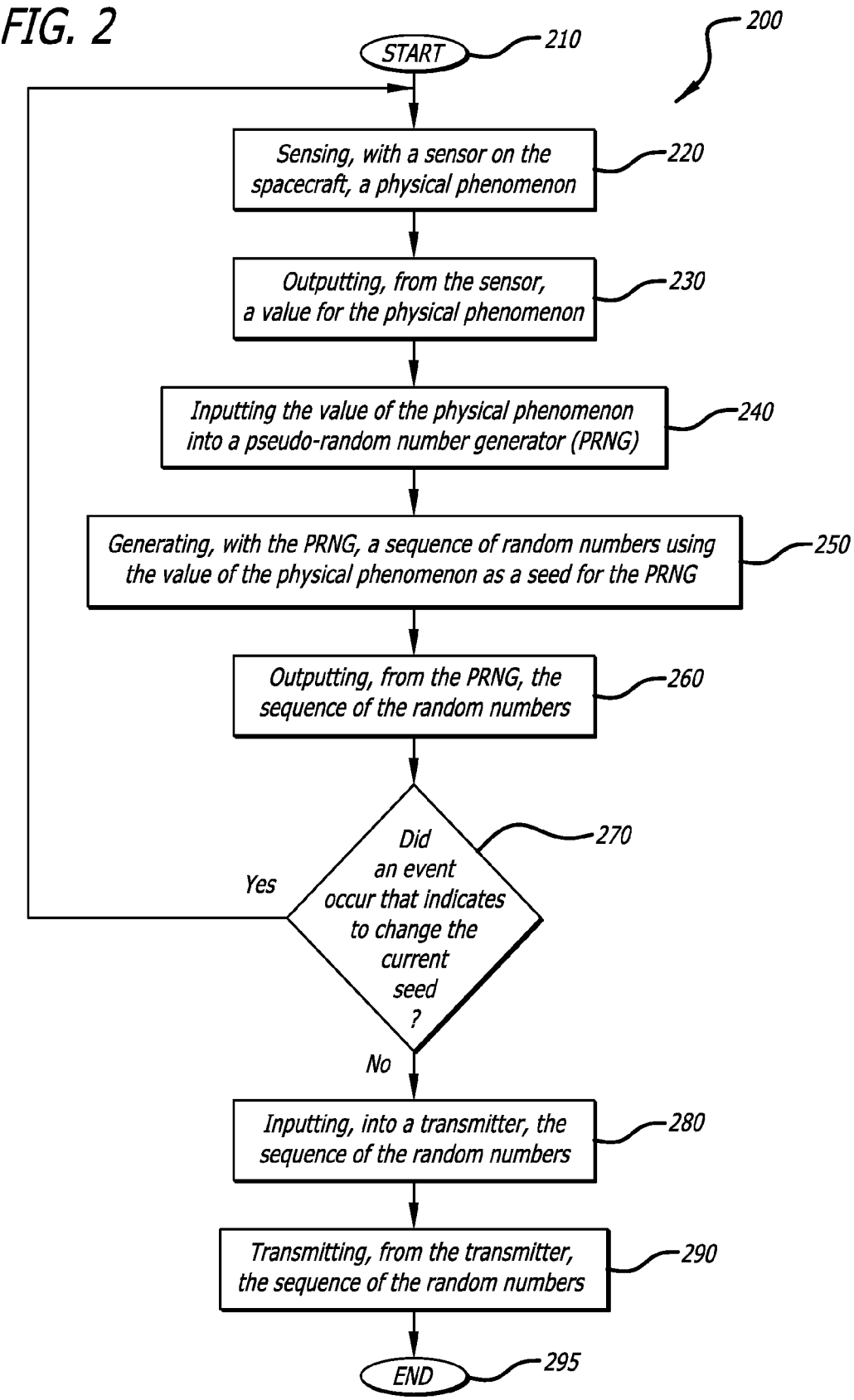
FIG. 2 is a flow diagram of the disclosed method for operation of the significant random number generator of FIG. 1, in accordance with at least one embodiment of the present disclosure.

FIG. 2 is a flow diagram 200 of the disclosed method for operation of the significant random number generator 100 of FIG. 1, in accordance with at least one embodiment of the present disclosure. In this figure, at the start 210 of the method, a sensor on the spacecraft senses a physical phenomenon 220. Then, the sensor outputs a value for the physical phenomenon that it sensed 230. The value of the physical phenomenon is then inputted into a pseudo-random number generator (PRNG) 240. The PRNG then generates a sequence of random numbers using the value of the physical phenomenon as a seed for the PRNG 250. Then, the PRGN outputs the sequence of random numbers. A processor then determines whether an event occurred that indicates to change the current seed being used for the PRNG 270.

Various types of events may be used by the disclosed method to indicate to change the current seed. Types of events that may be employed by the method include, but are not limited to, a predetermined time interval, a random time interval, a time interval that is dependent upon the sequence of the random numbers, an event related to an occurrence of a certain value of the random numbers, an event related to an occurrence of a certain value of the physical phenomenon that is sensed, an event related to an occurrence of a certain amount of change in the value of the physical phenomenon that is sensed, and an authentication request.

If the processor determines that an event did occur, the sensor on the spacecraft will sense the physical phenomenon again 220, and the method repeat. However, if the processor determines that an event did not occur, the sequence of random numbers is inputted into a transmitter 280. The transmitter then transmits the sequence of random numbers 290. After the transmitter has transmitted the random numbers, the method ends 295.

Spot Beam Based Authentication Embodiments

As previously mentioned above, the disclosed significant random number generator may be employed by various authentication applications. In one or more embodiments, the disclosed significant random number generator is utilized by a spot beam based authentication application. It should be noted that FIGS. 3 through 6, along with their corresponding descriptions, illustrate the system and method for spot beam based authentication. And, FIGS. 7A through 10, along with their corresponding descriptions, illustrate the disclosed spot beam based authentication system and method employing the disclosed significant random number generator, according to various different embodiments. A detailed description of the system and method for spot beam based authentication is presented below.

Entity or user authentication techniques enable a third party verifier to validate the identity of a user, asset, or a device (e.g., a claimant) for a remote resource through a one-way authentication method. However, it should be noted that this one-way method may also be used directly by a host system to validate a claimant. An entity may be a device (e.g., a mobile phone, computer, server, or the like) or asset that needs to be tracked, while a user can be a person or other living/non-living entity. An entity and/or user may be authenticated for the duration of an entire connection or session. The entity and/or user may require re-authentication after the original authentication. The re-authentication requirements may be defined by the host network and may be context specific. Alternatively, this system may be used for a message-based authentication system which requires a separate authentication process for each message. Techniques described herein may be used for either session-based authentication, message-based authentication, or a combination thereof.

Additionally, this method may be applied to receiving devices themselves, such that the one-way authentication does not have to be completed by a remote third party but rather by one or more of the receiving devices. When this method is conducted by a single device it is still considered a one-way authentication method. However, this method can also be applied in a multi-way authentication technique to allow at least two peer devices to authenticate each other. In this one-way or multi-way device-to-device authentication method, authentication may generally rely on a shared secret (symmetric and asymmetric) that each of the two legitimate receiving devices know and any unauthorized or rogue receiving device does not know. Each device may have a unique authentication credential such as a secret password shared between itself and the peer device or public/private key pairs in the form of security certificates. A device has authenticated itself when it proves, to the satisfaction of the other peer device, that it knows the shared secret, and is, therefore, legitimate. Once authentication is complete between the at least two devices in this multi-way authentication method, the devices have proven their identities to one another. The devices may then create their own authenticated network which they may choose to implement cyber security policies which have been agreed on so as to protect the communication and access to networked resources for a given context.

Existing authentication methods may be used or combined to generate the initial-security key(s). The initial-security key may, for example, be cooperatively generated using Diffie-Hellman techniques or may simply be generated by one peer device and sent to the other via an alternate secure channel/process.

In any case, accompanying the initial-security key may include some shared liveness information (as previously defined). In this application, the liveness information is provided through a satellite spot beam and may include such parameters for use in authentication as a timestamp and pseudo-random number (PRN).

The use of the shared liveness information may be used in the derivation allowing for different security keys to be used every time the initiating device authenticates itself to the peer device. This prevents a potential rogue eavesdropper from initiating a statistical attack every time the initiating device is authenticated, adding newly intercepted messages to its analysis of messages intercepted during the initiating device's previous sessions. The liveness information and the initial-security key may then be passed as inputs to a determinative function. As used herein the term "determinative" refers to a function for which the outputs of the function are completely determined by the inputs. This determinative function may be run separately on the initiating device and on the peer device. If these two devices were to produce different outputs when they ran the determinative function, then the security keys derived from the function would not match, the device could not be authenticated, and thus could not be used for intercommunication.

In addition to being determinative, for security's sake the function should be inherently irreversible. Knowing the function's outputs, it should be very difficult or impossible to determine its inputs. Hashes form a class of functions that are both determinative and inherently irreversible and, as such, are often used in encryption and authentication calculations. Pseudo-random function (PRF) used with the well known Transport Level Security (TLS) protocol are an example of the determinative function implementation which may be used.

PRF combines the results of two well known hash functions, Message-Digest Algorithm 5 (MD5) and Secure Hash Algorithm 1 (SHA-1). PRF uses two hash functions in order to preserve security just in case someone determines how to reverse one of the two hash functions. These two hash functions produce outputs that may be too short to be optimum for security. SHA-1 produces 20-byte outputs, and MD5 produces 16-byte outputs. Therefore, for each of the two hash functions, a "data expansion function" may be defined that uses the hash function to produce output of arbitrary length. For SHA-1, the data expansion function may be defined as P_SHA-1:

$$P\_SHA\text{-}1(\text{initial-security key, liveness}) = SHA\text{-}1(\text{initial-security key}, A(1)+\text{liveness}) + SHA\text{-}1(\text{initial-security key}, A(2)+\text{liveness}) + SHA\text{-}1(\text{initial-security key}, A(3)+\text{liveness}) + \ldots \quad \text{EQ 1:}$$

where $A(0)$=liveness;
$A(i)$=SHA-1(initial-security key, $A(i-1)$);
and the "+" sign indicates string concatenation.

The definition of the data expansion function P_MD5 is similar to the above definition with "MD5" replacing "SHA-1" wherever it appears. The data expansion functions may be iterated to as many steps as necessary to produce output of a desired length. The desired output length may be set as an implementation option. In at least one embodiment, the desired output length for each hash function is 128 bytes. P_SHA-1 may be iterated out to A(7) for a total output length of 140 bytes (each iteration increasing the output length by 20 bytes). The output may then be truncated to 128 bytes. Each iteration of P_MD5 produces 16 bytes, so iterating it out to A(8) produces the desired 128 bytes with no truncation.

In one embodiment for spot beam based authentication, having chosen the hash functions and iterated their data expansion functions out to the desired output length, PRF takes as inputs the expanded initial-security key, a label (a pre-determined ASCII string), and the liveness information exchanged. PRF is defined to be the exclusive bit-wise OR (XOR) of the output of the two hash data expansion functions, P_MD5 and P_SHA-1:

$$\text{PRF}(\text{expanded initial-security key, label, liveness}) = P\_MD5(S1, \text{label}+\text{liveness}) \text{ XOR } P\_SHA\text{-}1(S2, \text{label}+\text{liveness}) \quad \text{EQ: 2}$$

where S1 is the first half of the expanded initial-security key, measured in bytes, and S2 is the second half of the expanded initial-security key. (If the expanded initial-security key's length is odd, then its middle byte is both the last byte of S1 and the first byte of S2). As P_MD5 and P_SHA-1 are iterated to produce 128-byte outputs, the output of PRF is also 128 bytes.

The 128-byte output of PRF is divided into four 32-byte session security keys. Then each of the session security keys and truncates it to the length required by the authentication and encryption protocols being used. The truncated result is one of the new set of transient session security keys. The derivation of the transient session security keys allows for both the initiating device and peer device to not directly use either the initial-secret key or the expanded initial-security key in order to minimize, or at least to reduce, the leakage of the security key information. The derivation of the transient session security keys also allows for the initiating device and the peer device to refresh the session security keys derived from the expanded initial-security key at regular intervals or when commanded to prevent statistical analysis by limiting the use of the session security keys.

Each of the authentication and encryption transient session security keys have the following specific purpose: i) encryption of data exchanges, for confidentiality, from initiating device to peer device; ii) encryption of data exchanges, for confidentiality, from peer device to initiating device; iii) signing of data exchanges, for integrity, from initiating device to peer device; and iv) signing of data exchanges, for integrity, from peer device to initiating device.

Derivation of the initial-security key for the spot beam based authentication may use Diffie-Hellman techniques using agreed upon and well known public primitive root generator "g" and prime modulus "p". The initiating device and the peer device each choose a random secret integer and exchange their respective ((g^(secret integer)) mod p). This exchange allows the initiating device and peer device to derive the shared initial-secret key using Diffie-Hellman.

Having derived the initial-secret key that is shared between both the initiating device and the peer device they may use the data expansion to derive the expanded initial-secret using, for example, the P_SHA-1. The liveness information for the data expansion process may be a known random value or timestamp that is agreed upon by the initiating device and the peer device. In some embodiments, the peer device may select a random value and transmit it to the initiating device via the satellite or the terrestrial network. Alternatively, both the initiating device and the peer device may agree upon a timestamp, since they are tightly time synchronized, and thereby avoid data exchanges while being able to select liveness from the shared/common timestamp value.

Following this the initiating device and the peer device have a shared expanded initial-secret key that may be used to derive the new set of transient session security keys. Again for liveness the initiating device and the peer device may use either a shared random value that is transmitted by the peer device or a shared/common timestamp value. The transient session security keys may be used by initiating device and the peer device for further encryption and signing of geolocation and other context information exchanges between initiating device and peer device. Geolocation and other context information is considered confidential and hence it is required that such information be encrypted to ensure that only the authenticated initiating device and peer device can extract the exchanged geolocation and context information. Note that the geolocation is authenticated by the procedure described in this patent application using pseudorandom (PRN) code segments and distinctive beam parameter. The context information shared may include other state or control information for targeted cyber defense application execution or decision support systems. In addition to encryption the integrity of the exchanged geolocation and context information is ensured by the use of the transient session security keys for signing purposes as discussed earlier.

In brief overview, in some embodiments the authentication systems and methods described herein may leverage geolocation techniques for determining the position of the claimant as part of the authentication process. One such geolocation technique is defined in commonly assigned and copending U.S. patent application Ser. No. 12/756,961, entitled Geolocation Leveraging Spot Beam Overlap, the disclosure of which in incorporated herein by reference in its entirety. When authentication is required, the claimant device may capture and transmit the distinctive signature parameters to a verifying device. In addition, the claimant device may transmit its claimed travel path (i.e., waypoint(s) and time at each). Waypoints may be transmitted whether the device is stationary or mobile. A verification device may use the claimant's claimed beam signature parameters, at least one location waypoint, and at least one time associated with this waypoint and beam parameter capture to authenticate the claimant. For example, a claimant may be considered authenticated by the verifier if the beam parameters captured from the at least one spot beam and the at least one claimed waypoint are affirmed against a known valid data set. In this manner, the claimant can be authenticated as being within a region at a particular time. The composite code based on these parameters provide a signal that is extremely difficult to emulate, hack, or spoof. Furthermore, the signal structure and satellite's received signal power allows for the authentication to be used indoors or other attenuated environment. This improves the overall utility of this system approach.

The subject matter of this application is described primarily in the context of low-earth orbiting (LEO) satellites such as those implemented by Iridium satellites. However, one skilled in the art will recognize that the techniques described here are readily applicable to other satellite systems, e.g., medium-earth orbit (MEO) satellite systems or geosynchronous orbit (GEO) satellite systems. Such satellite based communication systems may include or utilize other mobile communication systems, e.g., airborne communication systems or the like, as well as, stationary communication platforms including but not limited to a ship or a cell phone tower.

Figure 3:
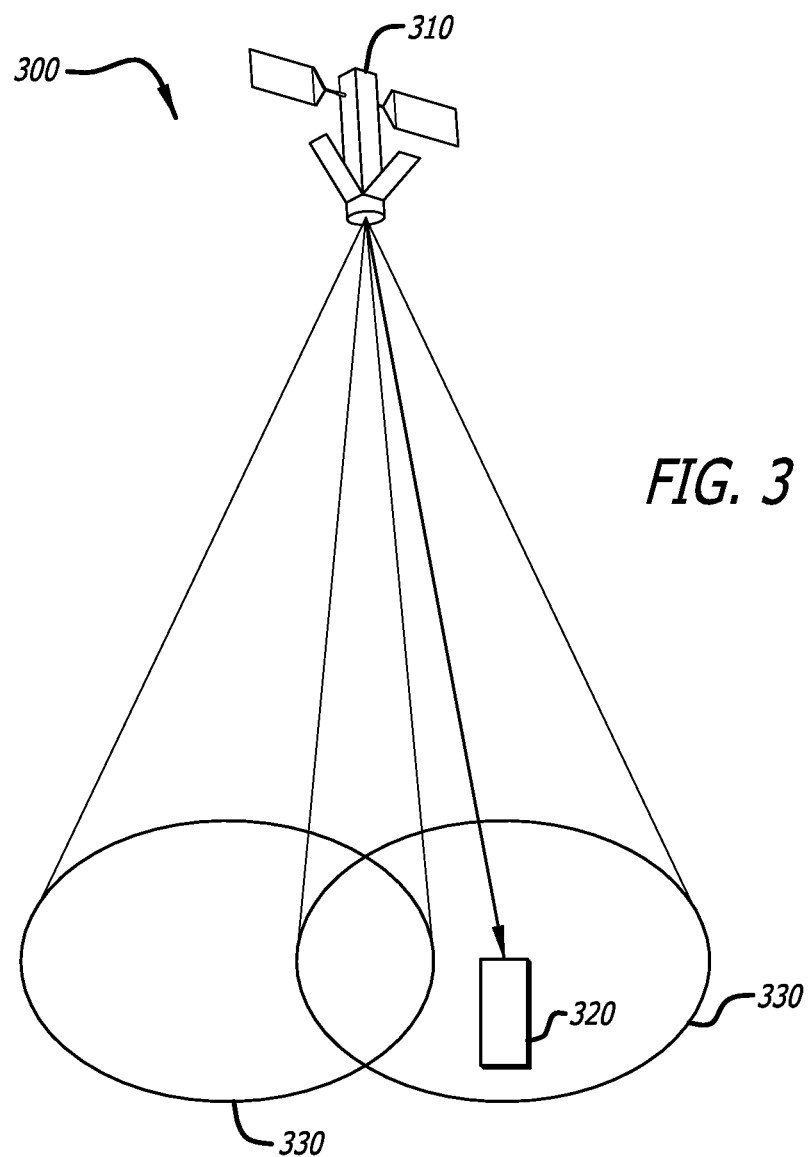
FIG. 3 is a schematic diagram of a satellite-based communication system that may be employed by the disclosed spot beam based authentication system, in accordance with at least one embodiment of the present disclosure.

FIG. 3 is a schematic illustration of a satellite-based communication system 300, according to embodiments. In practice, a satellite based communication system 300 may comprise of at least one satellite 310 in orbit. In the interest of brevity, a single satellite is illustrated in FIG. 3. Referring to FIG. 3, in some embodiments a system 300 comprises one or more satellites 310 in communication with one or more receiving devices 320. In some embodiments the satellites 310 may be embodied as LEO satellites such as those within the Iridium satellite constellation. Satellite(s) 310 orbit the earth in a known orbit and may transmit one or more spot beams 330 onto the surface of the earth in a known pattern. Each spot beam 330 may include information such as pseudorandom (PRN) data and one or more distinctive beam parameters (e.g. time, satellite ID, time bias, satellite orbit data, etc.).

Receiving device(s) 320 may be implemented as communication devices such as satellite or cellular phones or as components of a communication or computing device, e.g., a personal computer, laptop computer, personal digital assistant or the like. In some embodiments, a receiving device (320) may comprise one or more locating or navigation devices or modules analogous to devices used in connection with the global positioning system (GPS).

FIGS. 4A, 4B, and 4C are schematic illustrations of satellite-based authentication systems 400, according to embodiments. Referring first to FIG. 4A, in some embodiments a satellite 310 in orbit transmits one or more spot beams 330 onto the earth's surface. A receiving device 320 may be configured to receive a signal from the spot beam. In the embodiment depicted in FIG. 4A the receiving device is ground-based and may be operating in attenuated environment. By way of example, an object 410 such as a roof, building, or the like may obstruct a portion of the communication path between satellite 310 and the receiving device.

A transmitter 420 transmits data received by the receiving device 320 and/or data generated by the receiving device 320 to a verifier 430. The transmitter 420 depicted in FIG. 4 is a wireless transmitter that relays the data from the receiving device to the verifier. However, one skilled in the art will recognize that data from receiving device 320 may be transmitted via a wired communication system, wireless communication system, or a combination of wired and wireless systems. The verifier 430 uses data captured via a spot beam by the receiving device 320 to prove to the verifier 430 that it is an authorized user via a one-way authentication approach which is also the case in FIG. 4B.

Furthermore, FIG. 4B depicts an arrangement in which the receiving device 320 may be airborne, e.g., in an aircraft 325. In the embodiment depicted in FIG. 4B the aircraft 325 may maintain an uplink with the satellite 310, e.g., an L-Band Uplink, and data captured by the receiving device 320 in the aircraft may be transmitted back to the satellite 310 via the uplink. The satellite 310 may transmit the data to a second cross-linked satellite 310, which in turn may transmit the data to a verifier 430.

The system depicted in FIG. 4C illustrates an embodiment in which two (or more) peer devices 320 may implement a two-way authentication technique to authentication each other. Referring briefly to FIG. 4C as described above a satellite 310 in orbit transmits one or more spot beams 330 onto the earth's surface. A first receiving device 320A may be configured to receive a signal from the spot beam. The first receiving device 320A may be configured to derive a security key, e.g., using a Diffie-Helman approach as described above, which incorporates PRN data from the spot beam.

The PRN data is also transmitted to a second device 320B. In some embodiments the second device 320B may be outside the spot beam 330, in which case the PRN data may be transmitted by a computing device 440 coupled to the second device 320B via a communication network. The computing device 440 may be communicatively coupled to the satellite 310. By way of example, and not limitation, the computing device 440 may be a server that is separately coupled to the satellite 310 via a communication link. The computer 440 may be associated with a control network for satellite 310 and may thereby possess PRN data associated with the spot beam 330.

In operation, the first receiving device 320A initiates a request for authentication data, which is transmitted to the second receiving device 320B. The communication link between the first receiving device 320B may be direct or may be implemented through a transmit network 420. The second receiving device 320B responds to the request and issues a near-simultaneous request for authentication data from the first receiving device 320A. The first receiving device 320A authenticates the second receiving device 320B and issues a near-simultaneous response to for authentication data to the second receiving device 320B, which may then authenticate the first receiving device 320A.

As described above, the authentication process implemented between the first receiving device 320A and the second receiving device 320B may be a Diffie-Hellman exchange in which the shared secret comprises at least a portion of the PRN data transmitted by the spot beam 330. Thus, the system depicted in FIG. 4C enables peer-to-peer authentication of receiving device 320A, 320B. One skilled in the art will recognize that this two-way authentication approach could be extended to a receiving device and a server as well as other hardware architectures, or to more than two devices.

FIG. 5A is a schematic illustration of a computing system which may be adapted to implement a satellite based authentication system, according to embodiments. For example, in the embodiments depicted in FIGS. 5A and 5B the verifier 430 may be implemented by a computing system as depicted in FIG. 5A. Referring to FIG. 5A, in one embodiment, system 500 may include a computing device 508 and one or more accompanying input/output devices including a display 502 having a screen 504, one or more speakers 506, a keyboard 510, one or more other I/O device(s) 512, and a mouse 514. The other I/O device(s) 512 may include a touch screen, a voice-activated input device, a track ball, and any other device that allows the system 500 to receive input from a user.

The computing device 508 includes system hardware 520 and memory 530, which may be implemented as random access memory and/or read-only memory. A file store 580 may be communicatively coupled to computing device 508. File store 580 may be internal to computing device 508 such as, e.g., one or more hard drives, CD-ROM drives, DVD-ROM drives, or other types of storage devices. File store 580 may also be external to computer 508 such as, e.g., one or more external hard drives, network attached storage, or a separate storage network.

System hardware 520 may include one or more processors 522, at least two graphics processors 524, network interfaces 526, and bus structures 528. In one embodiment, processor 522 may be embodied as an Intel® Core2 Duo® processor available from Intel Corporation, Santa Clara, Calif., USA. As used herein, the term "processor" means any type of computational element, such as but not limited to, a microprocessor, a microcontroller, a complex instruction set computing (CISC) microprocessor, a reduced instruction set (RISC) microprocessor, a very long instruction word (VLIW) microprocessor, or any other type of processor or processing circuit.

Graphics processors 524 may function as adjunct processors that manage graphics and/or video operations. Graphics processors 524 may be integrated onto the motherboard of computing system 500 or may be coupled via an expansion slot on the motherboard.

In one embodiment, network interface 526 could be a wired interface such as an Ethernet interface (see, e.g., Institute of Electrical and Electronics Engineers/IEEE 802.3-2002) or a wireless interface such as an IEEE 802.11a, b or g-compliant interface (see, e.g., IEEE Standard for IT-Telecommunications and information exchange between systems LAN/MAN—Part II: Wireless LAN Medium Access Control (MAC) and Physical Layer (PHY) specifications Amendment 4: Further Higher Data Rate Extension in the 2.4 GHz Band, 802.11 G-2003). Another example of a wireless interface would be a general packet radio service (GPRS) interface (see, e.g., Guidelines on GPRS Handset Requirements, Global System for Mobile Communications/GSM Association, Ver. 3.0.1, December 2002).

Bus structures 528 connect various components of system hardware 520. In one embodiment, bus structures 528 may be one or more of several types of bus structure(s) including a memory bus, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

Memory 530 may include an operating system 540 for managing operations of computing device 508. In one embodiment, operating system 540 includes a hardware interface module 554 that provides an interface to system hardware 520. In addition, operating system 540 may include a file system 550 that manages files used in the operation of computing device 508 and a process control subsystem 552 that manages processes executing on computing device 508.

Operating system 540 may include (or manage) one or more communication interfaces that may operate in conjunction with system hardware 520 to transceive data packets and/or data streams from a remote source. Operating system 540 may further include a system call interface module 542 that provides an interface between the operating system 540 and one or more application modules resident in memory 530. Operating system 540 may be embodied as a UNIX operating system or any derivative thereof (e.g., Linux, Solaris, etc.) or as a Windows® brand operating system, or other operating systems.

In various embodiments, the computing device 508 may be embodied as a personal computer, a laptop computer, a personal digital assistant, a mobile telephone, an entertainment device, or another computing device.

In one embodiment, memory 530 includes an authentication module 562 to authenticate a claimant based on data received from the claimant. In one embodiment, an authentication module 562 may include logic instructions encoded in a non-transitory computer-readable medium which, when executed by processor 522, cause the processor 522 to authenticate a claimant based on data received from the claimant. In addition, memory 530 may comprise a satellite orbit database 564 which includes orbit information for satellites 310 in a predetermined orbit around the earth. Additional details about the authentication process and operations implemented by authentication module 562 are described below.

In some embodiments the receiving device 320 may be implemented as a satellite communication module adapted to couple with a conventional computing device 322 (e.g., a laptop, a PDA, or a smartphone device). The receiving device 320 may be coupled to the computing device 322 by a suitable communication connection, e.g., by a Universal Serial Bus (USB) interface, an RS-232 interface, an optical interface, or the like. In the embodiment depicted in FIG. 5B the receiving device 320 may be a "thin" device in the sense that it may include a receiver and limited processing capability, e.g., an application specific integrated circuit (ASIC) or a field programmable gate array (FPGA) configured to implement an authentication routine.

In operation, a user of the computing device 322 may utilize the receiving device 320 to authenticate the computing device 322 with a host network 590. As described above, the receiving device 320 depicted in FIG. 5B may receive a spot beam transmission 330 from the satellite 310 which includes a distinctive beam signature and a pseudo-random number (PRN). The computing device 322 may initiate an access request to the host network 590. The access request may include user specific information, e.g., a user ID, one or more coordinated from an earth-based coordinate system (e.g., a zip code, an area code, a latitude/longitude, a Universal Transverse Mercator (UTM); an Earth-Centered Earth-Fixed (ECEF), a World Geographic Reference System (GEOREF), or other miscellaneous system, for example, a zip code) and at least a portion of the PRN data received from the satellite 310.

The host network 590 may transmit a user access request to the verifier 430 as an authentication request. In some embodiments the host network may add additional information to the request en enable the verifier 430 to authenticate the computer 322. By way of example, the host network 590 may provide limitations regarding where (i.e., from what geographic locations) the claimant may be authenticated).

The verifier 430 may verify the claimant and provide an authentication response to the host network 590. The host network 590, in turn, may forward an access response to the computing device 322.

FIG. 6 is a flowchart illustrating operations in a method to authenticate a claimant, according to embodiments. Referring to FIG. 6, at operation 610 a claimant device determines a physical location of the claimant device. In some embodiments a claimant device 320 may comprise one or more location modules to determine a location of the claimant device 320. By way of example and not limitation, claimant device 320 may include, or be communicatively coupled to, a global positioning system (GPS) module to determine a location based on signals from the global positioning system. Alternatively, or in addition, claimant device 320 may include logic to determine a location based on signals from one or more LEO or MEO satellites 310 as described in one or more of U.S. Pat. Nos. 7,489,926, 7,372,400, 7,579,987, and 7,468,696, the disclosures of which are incorporated herein by reference in their respective entireties. In some embodiments the location of the claimant device 320 may be expressed in latitude/longitude coordinates or another earth-based coordinate system.

At operation 615 the claimant device 320 receives a spot beam transmission from a satellite 310. In some embodiments the claimant device 320 extracts one or more distinctive beam parameters (e.g. time, satellite ID, beam ID, time bias, satellite orbit data, etc.) including a pseudo random code segment from the satellite spot beam. In some embodiments the claimant device 320 may store the beam parameters in a memory module in, or communicatively coupled to, the claimant device 320. In one or more embodiments operation 615 may occur near simultaneously to its preceding operation 610.

At operation 620 the claimant device 320 may continue to generate one or more waypoint data snapshots which may include the location information for the claimant device 320 from operation 610, and one or more of the distinctive beam parameters transmitted via the satellite spot beam as noted in operation 620. In some embodiments the waypoint data snapshots may be stored in a memory module in, or communicatively coupled to, the claimant device 320.

In some embodiments the claimant device 320 may collect an array of waypoint data snapshots over time. For example an array of waypoint data snapshots may be constructed by receiving spot beams from a plurality of satellites 310 passing over the claimant device 320 over time. Alternatively, or in addition, an array of waypoint data snapshots may be constructed by moving the claimant device 320 in relation to the satellites 310, for example by placing the claimant device 320 in an aircraft 325 as depicted in FIG. 4B. An additional example would include a claimant device which acts as a tracker to validate the traveled route of an entity or asset which may include dangerous materials. The claimant device may be polled to provide waypoint data to verify the expected path matches that of the actual. The claimant device may be polled randomly.

At operation 620 the waypoint data snapshot(s) are transferred from the claimant device 320 to a verifier device 430. By way of example, in the embodiment depicted in FIG. 4A the waypoint data snapshot(s) may be transmitted via a transmitter 420 or by another communication network. In the embodiment depicted in FIG. 4B the waypoint data snapshot(s) may be transmitted from the aircraft 325 to a satellite 310, then may be transmitted via a satellite network to a verifier device 430.

At operation 625 the verifier device 430 receives location data and waypoint data from the claimant device 320. At operation 630 the verifier device 430 compares the location information and the waypoint data to corresponding data in a known valid data set in order to authenticate the claimant. By way of example, a LEO satellite such as the Iridium satellite constellation circumnavigates the earth in a known orbit, the approximate parameters of which are available well in advance. A verifier device 430 may include a satellite orbit database 564, or be communicatively coupled to a satellite orbit database 564, which includes orbit information about satellites 310 in a known orbit about the earth.

In some embodiments the location data and waypoint data received from the claimant device is compared (operation 630) with location and waypoint data from the known data set to determine whether the claimant device 320 is, in fact, within a reasonable threshold distance of an expected geographic location at an expected time. By way of example and not limitation, the satellite orbit database 564 may be searched for a data record corresponding to the distinctive beam parameters transmitted from the claimant device 320. When a matching record is located, the orbit data from the record retrieved from the orbit database 564 may be compared to the data received from the claimant device 320. For example, the known data may comprise a coordinate for the center of the spot beam 330 and an indication of the radius of the spot beam 330 on the surface of the earth. The coordinates received from the claimant device 320 may be compared to the location of the spot beam to determine whether the received data indicates that the claimant device 320 is within the region circumscribed by the spot beam at the time indicated in the data received from the claimant device. In at least one embodiment, the spot beam may be irregular shaped. In at least one embodiment the claimant device may be at an altitude above the surface of the earth.

If, at operation 635, the data received from the claimant device 320 indicates that the claimant device 320 is within a geographic region encompassed by the spot beam from the satellite 310 at the time associated with the data from the claimant device, then the claimant device 320 may be considered authenticated. In an authentication system, control then passes to operation 640 and the claimant is allowed to access a resource. By way of example and not limitation, the verifier device 430 may grant a token to an authenticated claimant device 320. The token may be used by a remote system to grant access to a resource.

By contrast, if the data received from the claimant device 320 indicates that the claimant device 320 is not within a geographic region encompassed by the spot beam from the satellite 310 at the time associated with the data from the claimant device 320, then the claimant device 320 may not be considered authenticated. In an authentication system, control then passes to operation 645 and the claimant is denied access to a resource. By way of example and not limitation, the verifier device 430 may deny a token to an authenticated claimant device 320. In the absence of a token the claimant device may be denied access to a resource managed by a remote system.

Thus, the system architecture depicted in FIGS. 3-5 and the method depicted in FIG. 6 enable satellite-based authentication of one or more claimant device(s) 320. The authentication system may be used to allow or deny access to one or more resources managed by a remote computing system. In some embodiments the claimant device(s) may be stationary, while in other embodiments the claimant device(s) may be mobile, and the authentication process may be either time-based, location-based, or a combination of both.

In some embodiments the system may be used to implement session-based authentication in which the claimant device(s) 320 are authenticated to use a resource for an entire session. In other embodiments the system may implement message-based authentication in which the claimant device(s) 320 must be authenticated separately for each message transmitted from the claimant device(s) 320 to a remote resource.

In one example implementation, an authentication system as described herein may be used to provide authentication for access to a secure computing resource such as a corporate email system, a corporate network, a military or civil infrastructure network, or an electronic banking facility. In other example implementations, an authentication system may be used to confirm the itinerary of a vehicle in a logistics system. By way of example, a mobile entity such as a truck, train, watercraft or aircraft may comprise one or more claimant device(s) 320. During the course of a scheduled mission a logistics system may periodically poll the claimant device(s) 320, which may respond with authentication data obtained from the satellite 310. The authentication data may be collected in the logistics system and used to confirm that the claimant device(s) are in specific locations at predetermined times in accordance with a logistics plan.

In yet another example, implementation of an authentication system as described herein may be used to verify the location of a claimant device(s) associated with a monitoring system, e.g., a house arrest surveillance system. In such embodiments the claimant device(s) may incorporate one or more biometric sensors such as a fingerprint biometric sensor to authenticate the user of the system, while the authentication system may be used to confirm that the claimant device is in a predetermined location at a predetermined time (i.e. The claimant is in the right place, at the right time, and is the right person). The authentication device may also review the claimant device location against a defined list of approved locations which may also further be refined by the authentication system by reviewing the claimant device's location and time against an approved set of location(s) at an approved time period(s). Furthermore, this system may be used to track registered sex offenders.

In some embodiments the satellite 310 may be part of a LEO satellite system such as the Iridium constellation which orbits the earth in a known orbit and which transmits spot beams having a known geometry, such that a claimant device(s) may be authenticated by confirming that the claimant device is within a designated spot beam at a designated time. Thus, a claimant may be authenticated using a single signal source (e.g., a single satellite 310). Also because LEO satellites such as the Iridium constellation and MEO satellites transmit a relatively high power signal levels the system may be used to authenticate one or more claimant device(s) which are located in an obstructed environment, e.g., indoors or in urban locations. Also, the relatively high signal strength of LEO satellites and MEO satellites leaves these signals less susceptible to jamming efforts.

FIG. 7A is a diagram of a first embodiment the disclosed spot beam based authentication system 700 employing the disclosed significant random number generator, in accordance with at least one embodiment of the present disclosure. In this figure, a sensor on the satellite 310 senses a physical phenomenon. The sensor outputs a value for the physical phenomenon. The value of the physical phenomenon is input into a pseudo-random number generator (PRNG) that is located on the satellite 310. The PRNG on the satellite 310 uses the value of the physical phenomenon as a seed to generate a sequence of random numbers. A transmitter on the satellite 310 transmits the sequence of random numbers in a spot beam 330 to a receiver 320 associated with a claimant. The transmitter also transmits the same sequence of random numbers to a computing device 440.

The claimant sends an access request along with the sequence of random numbers that it received from the satellite 310 to a host network 590 in order to access the host network 590. The host network 590 forwards the request and sequence of random numbers to the computing device 440. The computing device 440 uses a processor to compare the sequence of random numbers from the claimant with the sequence of random numbers it received directly from the satellite 310. The processor authenticates the claimant when the difference between the two sequences is less than a threshold. Once the claimant is authenticated, the computing device 440 sends an authentication response to the host network 590 for the host network to allow the claimant to have access. The host network 590, in turn, sends an access response to the claimant allowing the claimant to have access.

FIG. 7B is a diagram 710 of a satellite 310 employed by the disclosed system transmitting a plurality of spot beams 330 where each spot beam 330 has a different sequence of random numbers, in accordance with at least one embodiment of the present disclosure. As previously mentioned above, the disclosed system for generating random numbers may employ an Iridium LEO satellite for the spacecraft 310. Each of the satellites in the Iridium LEO satellite constellation have an antenna geometry that transmits spot beams with a distinctive spot beam pattern. In particular, this figure shows an exemplary satellite 310 that may be employed by the disclosed system that is transmitting six spot beams 330 in a particular spot beam pattern, with a receiver 320 being located in the center spot beam 330. For the disclosed system, each of the spot beams may contain the same sequence of random numbers. However, it should be noted that in some embodiments of the disclosed system, each of the spot beams may contain different sequences of random numbers (RNs), as is shown in the figure (e.g., a first spot beam may have a RN sequence=6219, a second spot beam may have a RN sequence=2606, a third spot beam may have a RN sequence=1713, a fourth spot beam may have a RN sequence=0024, a fifth spot beam may have a RN sequence=1872, and a sixth spot beam may have a RN sequence=0561).

FIG. 8 is a diagram of a second embodiment the disclosed spot beam based authentication system 800 employing the disclosed significant random number generator, in accordance with at least one embodiment of the present disclosure. In this figure, a sensor on the satellite 310 senses a physical phenomenon. The sensor then outputs a value for the physical phenomenon. The value of the physical phenomenon is input into a pseudo-random number generator (PRNG) that is located on the satellite 310. The PRNG on the satellite 310 uses the value of the physical phenomenon as a seed to generate a sequence of random numbers. A transmitter on the satellite 310 transmits the sequence of random numbers in a spot beam 330 to a first receiver 320A associated with a first claimant. The transmitter also transmits the same sequence of random numbers to a computing device 440, which may simply be a receiver in some embodiments. The computing device 440 forwards the sequence of random numbers to a second receiver 320B associated with a second claimant.

For this embodiment, the first claimant would like to initiate a secure communications connection with the second claimant. In this figure, a transmitter associated with first claimant sends a request to the second claimant for authentication data to initiate the secure connection. In response, a transmitter associated with the second claimant sends to a receiver associated with the first claimant a response to the request along with the sequence of random numbers it received from the computing device 440, and sends a request for authentication data. A processor associated with the first claimant, compares the sequence of random numbers it received from the satellite 310 to the sequence of random numbers it received from the second claimant. If the processor associated with the first claimant determines that the difference between the two sequences is less than a certain threshold, the processor of the first claimant will authenticate the second claimant, and the transmitter associated with the first claimant will transmit the sequence of random numbers it received from the satellite 310 to a receiver associated with the second claimant.

Once the receiver associated with the second claimant receives the sequence, a processor associated with the second claimant compares the sequence of random numbers it received from the computing device 440 to the sequence of random numbers it received from the first claimant. If the processor associated with the second claimant determines that the difference between the two sequences is less than a certain threshold, the processor of the second claimant will authenticate the first claimant, and a secure communications connection will be established between the first claimant and the second claimant.

FIG. 9 is a diagram of a third embodiment the disclosed spot beam based authentication system 900 employing the disclosed significant random number generator, in accordance with at least one embodiment of the present disclosure. In this figure, a sensor on the satellite 310 senses a physical phenomenon. The sensor outputs a value for the physical phenomenon. The value of the physical phenomenon is input into a pseudo-random number generator (PRNG) that is located on the satellite 310. The PRNG on the satellite 310 uses the value of the physical phenomenon as a seed to generate a sequence of random numbers. A transmitter on the satellite 310 transmits the sequence of random numbers in a spot beam 330 to a receiver 320 associated with a claimant. The transmitter also transmits the value of the physical phenomenon (i.e. the seed) to a computing device 440.

A PRNG contained in the computing device 440 uses the value of the physical phenomenon it received from the satellite 310 as a seed to generate a sequence of random numbers. It should be noted that the PRNG in the satellite 310 and the PRNG in the computing device 440 both utilize the same random number generator algorithm.

The claimant sends an access request along with the sequence of random numbers that it received from the satellite 310 to a host network 590 in order to access the host network 590. The host network 590 forwards the request and sequence of random numbers to the computing device 440. The computing device 440 uses a processor to compare the sequence of random numbers from the claimant with the sequence of random numbers it generated. The processor authenticates the claimant when the difference between the two sequences is less than a threshold. Once the claimant is authenticated, the computing device 440 sends an authentication response to the host network 590 for the host network to allow the claimant to have access. The host network 590, in turn, sends an access response to the claimant allowing the claimant to have access.

FIG. 10 is a diagram of a fourth embodiment the disclosed spot beam based authentication system 1000 employing the disclosed significant random number generator, in accordance with at least one embodiment of the present disclosure. In this figure, a sensor on the satellite 310 senses a physical phenomenon. The sensor then outputs a value for the physical phenomenon. The value of the physical phenomenon is input into a pseudo-random number generator (PRNG) that is located on the satellite 310. The PRNG on the satellite 310 uses the value of the physical phenomenon as a seed to generate a sequence of random numbers. A transmitter on the satellite 310 transmits the sequence of random numbers in a spot beam 330 to a first receiver 320A associated with a first claimant. The transmitter also transmits the value of the physical phenomenon to a computing device 440.

A PRNG contained in the computing device 440 uses the value of the physical phenomenon it received from the satellite 310 as a seed to generate a sequence of random numbers. It should be noted that the PRNG in the satellite 310 and the PRNG in the computing device 440 both utilize the same random number generator algorithm. The computing device 440 forwards the sequence of random numbers it generated to a second receiver 320B associated with a second claimant.

In this embodiment, the first claimant would like to initiate a secure communications connection with the second claimant. In this figure, a transmitter associated with first claimant sends a request to the second claimant for authentication data to initiate the secure connection. In response, a transmitter associated with the second claimant sends to a receiver associated with the first claimant a response to the request along with the sequence of random numbers it received from the computing device 440, and sends a request for authentication data. A processor associated with the first claimant, compares the sequence of random numbers it received from the satellite 310 to the sequence of random numbers it received from the second claimant. If the processor associated with the first claimant determines that the difference between the two sequences is less than a certain threshold, the processor of the first claimant will authenticate the second claimant, and the transmitter associated with the first claimant will transmit the sequence of random numbers it received from the satellite 310 to a receiver associated with the second claimant.

Once the receiver associated with the second claimant receives the sequence, a processor associated with the second claimant compares the sequence of random numbers it received from the computing device 440 to the sequence of random numbers it received from the first claimant. If the processor associated with the second claimant determines that the difference between the two sequences is less than a certain threshold, the processor of the second claimant will authenticate the first claimant, and a secure communications connection will be established between the first claimant and the second claimant.

Cryptography Embodiments

FIG. 11 is diagram of a cryptography system 1100 employing the disclosed significant random number generator, in accordance with at least one embodiment of the present disclosure. In this figure, a sensor on the satellite 310 senses a physical phenomenon. The sensor outputs a value for the physical phenomenon. A transmitter on the satellite 310 transmits the value of the physical phenomenon in a spot beam to a receiver 320 associated with a claimant.

The value of the physical phenomenon is inputted into a pseudo-random number generator (PRNG) that is associated with the claimant. The PRNG uses the value of the physical phenomenon as a seed to generate a sequence of random numbers. A processor associated with the claimant uses the sequence of the random numbers as a key to encrypt and decrypt data the claimant receives from another claimant. It should be noted that the two claimants must both utilize the same random number generator algorithm and the same seed in order to generate the same random number sequence key to use for the encryption and decryption. The two claimants may decide at a time prior to transmission of the data or at a time post transmission of the data exactly which value of the physical phenomenon to use for the seed. For example, the two claimants, prior to transmission of the data, may agree to use the value of the voltage of a particular resistor on the satellite 310 at a certain day and time. As such, for this embodiment, both claimants must have access to this particular data from the satellite 310.

In alternative embodiments, it should be noted that the transmitter on the satellite 310, may transmit the value of the physical phenomenon to the receiver 320 associated with a claimant via a receiver 455, which may be associated with a ground station, and via a host network 590.

Routing Network Traffic Embodiments

FIG. 12 is a diagram of a system 1200 for routing network traffic employing the disclosed significant random number generator, in accordance with at least one embodiment of the present disclosure. In this figure, a sensor on the satellite 310 senses a physical phenomenon. The sensor outputs a value for the physical phenomenon. A transmitter on the satellite 310 transmits the value of the physical phenomenon to a computing device 440.

The value of the physical phenomenon is input into a pseudo-random number generator (PRNG) that is associated with the computing device 440. The PRNG uses the value of the physical phenomenon as a seed to generate a sequence of random numbers. The computing device 440 transmits the sequence of random numbers to a network router 1210. A processor associated with the network router 1210 generates routing instructions using the sequence of the random numbers. The routing instructions are used to route messages through the network in a random way throughout the nodes, thereby minimizing conflicts and uniformly distributing the message traffic. For example, in this figure, a message is shown to be routed from a message origination node 1220 through a number of intermediate nodes 1230 to a message destination node 1240.

Anti-Jamming Embodiments

FIG. 13 is a diagram of a system 1300 for anti-jamming employing the disclosed significant random number generator, in accordance with at least one embodiment of the present disclosure. In this figure, a sensor on the satellite 310 senses a physical phenomenon. The sensor outputs a value for the physical phenomenon. A transmitter on the satellite 310 transmits the value of the physical phenomenon to a receiver 455. The receiver 455 forwards the value of the physical phenomenon to a network distributor 1310.

Once the network distributor 1310 receives the value of the physical phenomenon, the network distributor 1310 distributes the value of the physical phenomenon to a plurality of communication nodes 1320. Each of the communication nodes has an associated PRNG, and each PRNG uses the same random number generation algorithm. The value of the physical phenomenon is input into each PRNG.

Each PRNG uses the value of the physical phenomenon as a seed to generate a sequence of random numbers. Each of the communication nodes also has an associated processor. Each processor generates an anti-jamming sequence using the sequence of random numbers generated from its associated PRNG.

Certified Time Stamping Embodiments

FIG. 14 is a diagram of a system 1400 for certified time stamping employing the disclosed significant random number generator, in accordance with at least one embodiment of the present disclosure. In this figure, a sensor on the satellite 310 senses a physical phenomenon. The sensor outputs a value for the physical phenomenon. A transmitter on the satellite 310 transmits the value of the physical phenomenon to a receiver 455. The value of the physical phenomenon is input into a pseudo-random number generator (PRNG). The PRNG uses the value of the physical phenomenon as a seed to generate a sequence of random numbers.

In this figure, a user 1410 is shown to create an electronic document 1420 by using a computing device. A processor, which may be associated with the computing device, is used to create a certified time stamp 1430 for the electronic document 1420. A processor is used to encrypt the certified time stamp 1450 using the sequence of random numbers as a key. After the certified time stamp 1450 is encrypted, the encrypted certified time stamp is released to the public over a host network 1460.

Secure Identification Embodiments

FIG. 15 is a diagram of a system 1500 for secure identification (ID) employing the disclosed significant random number generator, in accordance with at least one embodiment of the present disclosure. In this figure, a sensor on the satellite 310 senses a physical phenomenon. The sensor outputs a value for the physical phenomenon. A transmitter on the satellite 310 transmits the value of the physical phenomenon in a spot beam 330 to a receiver on a device 1510 associated with a claimant 1520.

The value of the physical phenomenon is input into a pseudo-random number generator (PRNG) that is located on the device 1510. The PRNG uses both the value of the physical phenomenon as a seed and an additional seed that is associated with the claimant to generate a sequence of random numbers. A transmitter on the device 1510 forwards the sequence of random numbers to a computing device (not shown) associated with a host network 590 in order for the claimant to be authenticated to obtain access to the host network 590. Once the computing device authenticates the claimant 1520 by verifying the sequence of random numbers, a communications link between the device 1510 associated with the claimant 1520 and the host network 590 is established.

Although certain illustrative embodiments and methods have been disclosed herein, it can be apparent from the foregoing disclosure to those skilled in the art that variations and modifications of such embodiments and methods can be made without departing from the true spirit and scope of the art disclosed. Many other examples of the art disclosed exist, each differing from others in matters of detail only. Accordingly, it is intended that the art disclosed shall be limited only to the extent required by the appended claims and the rules and principles of applicable law.

We claim:

1. A method for a random number generator using physical phenomena relating to a spacecraft, the method comprising:

sensing, with a sensor, at least one random physical phenomenon originating from electronics internal to the spacecraft;

outputting, from the sensor, a value for the at least one random physical phenomenon;

inputting, into a pseudo-random number generator (PRNG), the value for the at least one random physical phenomenon;

generating, with the PRNG, a truly random sequence of random numbers by using at least a portion of the value of the at least one random physical phenomenon as at least one seed for the PRNG;

outputting, from the PRNG, the truly random sequence of the random numbers; and transmitting, from the spacecraft, the outputted truly random sequence of the random numbers.

2. The method of claim 1, wherein the at least one physical phenomenon is at least one of temperature of the spacecraft, resistance of a resistor on the spacecraft, thermal noise, radio frequency (RF) noise, shot noise produced from a reversed biased diode, white noise produced from an analog-to-digital (A/D) converter, a fluctuation of a voltage of a unit on the spacecraft, a fluctuation of a voltage of a resistor on the spacecraft, a fluctuation of a temperature of the unit on the spacecraft, a fluctuation of magnetic field of the unit on the spacecraft, and radioactive decay of a radioactive material on the spacecraft.

3. The method of claim 1, wherein the method further comprises:

inputting, into a transmitter, the sequence of the random numbers; and transmitting, from the transmitter, the sequence of the random numbers.

4. The method of claim 3, wherein the transmitter is a radio frequency (RF) antenna.

5. The method of claim 1, wherein the method further comprises determining whether an event occurs that indicates to obtain at least one new seed to input into the PRNG.

6. The method of claim 5, wherein, the method further comprises sensing, with the sensor, at least one physical phenomenon again to obtain a new value for the physical phenomenon to be used by the PRNG as the at least one new seed, when the processor determines that the event has occurred.

7. The method of claim 5, wherein the event is at least one of a predetermined time interval, a random time interval, a time interval that is dependent upon the sequence of the random numbers, related to an occurrence of a certain value of the random numbers, related to an occurrence of a certain value of the physical phenomenon that is sensed, related to an occurrence of a certain amount of change in the value of the physical phenomenon that is sensed, and an authentication request.

8. The method of claim 1, wherein the sensor is on the spacecraft.

9. The method of claim 8, wherein the spacecraft is one of a satellite and a pseudo-satellite.

10. The method of claim 9, wherein the satellite is one of a low Earth orbiting (LEO) satellite, a medium Earth orbiting (MEO) satellite, and a geosynchronous Earth orbiting (GEO) satellite.

11. The method of claim 10, wherein the LEO satellite is an Iridium satellite.

12. The method of claim 1, wherein the PRNG is located on one of the spacecraft and a terrestrial location.

13. A system for generating random numbers using physical phenomena relating to a spacecraft, the system comprising:
- a sensor device configured to sense at least one random physical phenomenon originating from electronics internal to the spacecraft, and to output a value for the at least one random physical phenomenon; and
- a pseudo-random number generator (PRNG) to receive the value for the at least one random physical phenomenon, to generate a truly random sequence of random numbers by using at least a portion of the value of the at least one random physical phenomenon as at least one seed for the PRNG, and to output the truly random sequence of the random numbers; and
- the spacecraft to transmit the outputted truly random sequence of the random numbers.

14. The system of claim 13, wherein the physical phenomenon is at least one of temperature of the spacecraft, resistance of a resistor on the spacecraft, thermal noise, radio frequency (RF) noise, shot noise produced from a reversed biased diode, white noise produced from an analog-to-digital (A/D) converter, a fluctuation of a voltage of a unit on the spacecraft, a fluctuation of a voltage of a resistor on the spacecraft, a fluctuation of a temperature of the unit on the spacecraft, a fluctuation of magnetic field of the unit on the spacecraft, and radioactive decay of a radioactive material on the spacecraft.

15. The system of claim 13, wherein the system further comprises a transmitter configured to transmit the sequence of the random numbers that are outputted from the PRNG.

16. The system of claim 15, wherein the transmitter is a radio frequency (RF) antenna.

17. The system of claim 13, wherein the system further comprises a processor configured to determine whether an event occurs that indicates to obtain at least one new seed to input into the PRNG.

18. The system of claim 17, wherein the sensor device is further configured to sense the physical phenomenon again to obtain a new value for the at least one physical phenomenon to be used by the PRNG as at least one new seed, when the processor determines that the event has occurred.

19. The system of claim 17, wherein the event is at least one of a predetermined time interval, a random time interval, a time interval that is dependent upon the sequence of the random numbers, related to an occurrence of a certain value of the random numbers, related to an occurrence of a certain value of the physical phenomenon that is sensed, related to an occurrence of a certain amount of change in the value of the physical phenomenon that is sensed, and an authentication request.

20. The system of claim 13, wherein the sensor device is on the spacecraft.

21. The system of claim 20, wherein the spacecraft is one of a satellite and a pseudo-satellite.

22. The system of claim 21, wherein the satellite is one of a low Earth orbiting (LEO) satellite, a medium Earth orbiting (MEO) satellite, and a geosynchronous Earth orbiting (GEO) satellite.

23. The system of claim 22, wherein the LEO satellite is an Iridium satellite.

24. The system of claim 13, wherein the PRNG is located on one of the spacecraft and a terrestrial location.

* * * * *